US009609692B2

United States Patent
Bilchinsky et al.

(10) Patent No.: US 9,609,692 B2
(45) Date of Patent: Mar. 28, 2017

(54) DEVICE AND METHOD FOR CONTROLLING ENERGY

(71) Applicant: Goji Limited, Hamilton (BM)

(72) Inventors: Alexander Bilchinsky, Monosson-Yahud (IL); Eran Ben-Shmuel, Savyon (IL); Pinchas Einziger, Haifa (IL); Amit Rappel, Ofra (IL)

(73) Assignee: GOJI LIMITED, Hamilton (BM)

( * ) Notice: Subject to any disclaimer, the term of this patent is extended or adjusted under 35 U.S.C. 154(b) by 296 days.

(21) Appl. No.: 13/645,625

(22) Filed: Oct. 5, 2012

(65) Prior Publication Data

US 2013/0062334 A1 Mar. 14, 2013

Related U.S. Application Data

(63) Continuation of application No. 13/508,940, filed as application No. PCT/IL2010/000380 on May 12, 2010, now Pat. No. 9,215,756.

(Continued)

(30) Foreign Application Priority Data

Nov. 10, 2009 (WO) .................. PCT/IL2009/001057

(51) Int. Cl.
*H05B 1/02* (2006.01)
*H05B 6/44* (2006.01)
(Continued)

(52) U.S. Cl.
CPC ................ *H05B 1/02* (2013.01); *H05B 6/00* (2013.01); *H05B 6/6447* (2013.01);
(Continued)

(58) Field of Classification Search
None
See application file for complete search history.

(56) References Cited

U.S. PATENT DOCUMENTS

| 2,489,337 A | 11/1949 | Sperling |
|---|---|---|
| 2,543,130 A | 2/1951 | Robertson |

(Continued)

FOREIGN PATENT DOCUMENTS

| CN | 1968609 | 5/2007 |
|---|---|---|
| CN | 101513118 | 8/2009 |

(Continued)

OTHER PUBLICATIONS

Second Office Action issued by the Chinese State Office of Intellectual Property in Chinese Application No. 200980154040.9, dated Jul. 25, 2013, 6 pages.

(Continued)

*Primary Examiner* — Joseph M Pelham
(74) *Attorney, Agent, or Firm* — Finnegan, Henderson, Farabow, Garrett & Dunner, LLP

(57) ABSTRACT

Apparatuses and methods for applying EM energy to a load. The apparatuses and methods may include at least one processor configured to receive information indicative of energy dissipated by the load for each of a plurality of modulation space elements. The processor may also be configured to associate each of the plurality of modulation space elements with a corresponding time duration of power application, based on the received information. The processor may be further configured to regulate energy applied to the load such that for each of the plurality of modulation space elements, power is applied to the load at the corresponding time duration of power application.

38 Claims, 11 Drawing Sheets

Related U.S. Application Data

(60) Provisional application No. 61/282,981, filed on May 3, 2010, provisional application No. 61/282,980, filed on May 3, 2010, provisional application No. 61/282,983, filed on May 3, 2010.

(51) Int. Cl.
  *H05B 6/64* (2006.01)
  *H05B 6/72* (2006.01)
  *H05B 6/70* (2006.01)
  *H05B 6/00* (2006.01)
  *H05B 6/68* (2006.01)

(52) U.S. Cl.
  CPC ............. *H05B 6/686* (2013.01); *H05B 6/688* (2013.01); *H05B 6/70* (2013.01); *H05B 6/705* (2013.01); *H05B 6/72* (2013.01); *H05B 2206/044* (2013.01); *Y02B 40/143* (2013.01); *Y02B 40/146* (2013.01)

(56) References Cited

U.S. PATENT DOCUMENTS

| | | |
|---|---|---|
| 2,593,067 A | 4/1952 | Spencer |
| 2,895,828 A | 7/1959 | Kamide |
| 2,917,739 A | 12/1959 | Halpern |
| 3,019,399 A | 1/1962 | Lanciani et al. |
| 3,151,325 A | 9/1964 | Kompfner |
| 3,231,892 A | 1/1966 | Matson et al. |
| 3,633,538 A | 1/1972 | Hoeflin |
| 3,681,652 A | 8/1972 | Domenichini et al. |
| 3,767,884 A | 10/1973 | Osepchuk et al. |
| 3,806,689 A | 4/1974 | Kegereis et al. |
| 3,936,627 A | 2/1976 | Fitzmayer |
| 3,985,993 A | 10/1976 | Imberg et al. |
| 4,035,599 A | 7/1977 | Kashyap et al. |
| 4,081,647 A | 3/1978 | Torrey |
| 4,137,441 A | 1/1979 | Bucksbaum |
| 4,146,768 A | 3/1979 | Orke et al. |
| 4,165,454 A | 8/1979 | Carlsson et al. |
| 4,196,332 A | 4/1980 | MacKay B et al. |
| 4,210,795 A | 7/1980 | Lentz |
| 4,250,628 A | 2/1981 | Smith et al. |
| 4,279,722 A | 7/1981 | Kirkbridge |
| 4,336,435 A | 6/1982 | Kashyap et al. |
| 4,342,035 A | 7/1982 | Anderson et al. |
| 4,342,896 A | 8/1982 | Teich |
| 4,354,153 A | 10/1982 | Lentz |
| 4,371,770 A | 2/1983 | Gilliatt |
| 4,377,733 A | 3/1983 | Yamaguchi et al. |
| 4,415,789 A * | 11/1983 | Nobue et al. ............... 219/709 |
| 4,418,262 A | 11/1983 | Noda |
| 4,431,888 A | 2/1984 | Simpson |
| 4,447,693 A | 5/1984 | Buck |
| 4,464,554 A | 8/1984 | Bakanowski et al. |
| 4,471,194 A | 9/1984 | Hosokawa et al. |
| 4,475,024 A | 10/1984 | Tateta |
| 4,485,285 A | 11/1984 | Machesne |
| 4,488,027 A | 12/1984 | Dudley et al. |
| 4,507,530 A | 3/1985 | Smith |
| 4,508,948 A | 4/1985 | Carlson |
| 4,517,429 A | 5/1985 | Horinouchi |
| 4,568,810 A | 2/1986 | Carmean |
| 4,589,423 A | 5/1986 | Turner |
| 4,596,915 A | 6/1986 | Simpson |
| 4,602,141 A | 7/1986 | Naito et al. |
| 4,695,694 A | 9/1987 | Hill et al. |
| 4,794,218 A | 12/1988 | Nakano et al. |
| 4,822,968 A | 4/1989 | Chin |
| 4,855,555 A | 8/1989 | Adams et al. |
| 4,897,151 A | 1/1990 | Killackey et al. |
| 4,931,798 A | 6/1990 | Kogo |
| 4,939,331 A * | 7/1990 | Berggren et al. ............ 219/716 |
| 5,008,506 A * | 4/1991 | Asmussen et al. ........... 219/696 |
| 5,036,171 A | 7/1991 | Kim et al. |
| 5,036,172 A | 7/1991 | Kokkeler et al. |
| 5,066,503 A | 11/1991 | Ruozi |
| 5,074,200 A | 12/1991 | Ruozi |
| 5,146,059 A | 9/1992 | Seog Tae |
| 5,191,182 A | 3/1993 | Gelorme et al. |
| 5,202,095 A | 4/1993 | Houchin et al. |
| 5,293,019 A | 3/1994 | Lee |
| 5,321,222 A | 6/1994 | Bible et al. |
| 5,321,897 A | 6/1994 | Holst et al. |
| 5,451,751 A | 9/1995 | Takimoto |
| 5,468,940 A | 11/1995 | Kang |
| 5,512,736 A | 4/1996 | Kang et al. |
| 5,521,360 A | 5/1996 | Johnson et al. |
| 5,558,800 A | 9/1996 | Page |
| 5,616,268 A | 4/1997 | Carr |
| 5,632,921 A | 5/1997 | Risman et al. |
| 5,698,128 A | 12/1997 | Sakai et al. |
| 5,721,286 A | 2/1998 | Lauf et al. |
| 5,789,724 A | 8/1998 | Lerssen et al. |
| 5,798,395 A | 8/1998 | Lauf et al. |
| 5,804,801 A | 9/1998 | Lauf et al. |
| 5,812,393 A | 9/1998 | Drucker |
| 5,818,649 A | 10/1998 | Anderson |
| 5,828,040 A | 10/1998 | Risman |
| 5,828,042 A | 10/1998 | Choi et al. |
| 5,834,744 A | 11/1998 | Risman |
| 5,873,254 A | 2/1999 | Arav |
| 5,877,479 A | 3/1999 | Yu |
| 5,883,801 A | 3/1999 | Drucker et al. |
| 5,927,265 A | 7/1999 | McKee et al. |
| 5,942,144 A | 8/1999 | Lee |
| 5,958,278 A | 9/1999 | Engebritson et al. |
| 5,961,871 A | 10/1999 | Bible et al. |
| 5,977,532 A | 11/1999 | Ekemar |
| 5,981,927 A | 11/1999 | Osepchuk et al. |
| 5,981,928 A | 11/1999 | Lee |
| 5,986,249 A | 11/1999 | Yoshino et al. |
| 5,998,775 A | 12/1999 | Sung |
| 6,060,701 A | 5/2000 | McKee et al. |
| 6,096,361 A | 8/2000 | Yamane et al. |
| 6,104,018 A | 8/2000 | Varma et al. |
| 6,114,677 A | 9/2000 | Idomoto et al. |
| 6,166,551 A | 12/2000 | Scott et al. |
| 6,169,277 B1 | 1/2001 | Feher et al. |
| 6,172,348 B1 | 1/2001 | Yoshino et al. |
| 6,191,402 B1 | 2/2001 | Ekemar |
| 6,225,940 B1 | 5/2001 | Ohlsen |
| 6,249,710 B1 | 6/2001 | Drucker et al. |
| 6,252,206 B1 | 6/2001 | Leukhardt, III et al. |
| 6,262,406 B1 | 7/2001 | McKee et al. |
| 6,263,830 B1 | 7/2001 | Kamarehi et al. |
| 6,274,859 B1 | 8/2001 | Yoshino et al. |
| 6,320,165 B1 | 11/2001 | Ovadia |
| 6,320,171 B1 | 11/2001 | Kim |
| 6,384,392 B1 | 5/2002 | Lee et al. |
| 6,444,966 B2 | 9/2002 | Mukumoto et al. |
| 6,462,320 B1 | 10/2002 | Fuls et al. |
| 6,476,766 B1 | 11/2002 | Cohen |
| 6,487,950 B2 | 12/2002 | Samland |
| 6,537,492 B1 | 3/2003 | Sogaard |
| 6,563,097 B2 | 5/2003 | Taino et al. |
| 6,576,879 B1 | 6/2003 | Hoh |
| 6,586,714 B2 | 7/2003 | Kawamura et al. |
| 6,590,192 B2 | 7/2003 | Taino et al. |
| 6,614,011 B2 | 9/2003 | Omori et al. |
| 6,657,173 B2 | 12/2003 | Flugstad et al. |
| 6,674,056 B2 | 1/2004 | Lee |
| 6,680,467 B1 * | 1/2004 | Whipple, Jr. ............... 219/747 |
| 6,686,567 B1 | 2/2004 | Hwang |
| 6,720,541 B2 | 4/2004 | Watanabe et al. |
| 6,770,859 B2 | 8/2004 | Kang |
| 6,812,442 B2 | 11/2004 | Kim et al. |
| 6,812,443 B2 | 11/2004 | Noda et al. |
| 6,815,644 B1 | 11/2004 | Muegge et al. |
| 6,838,648 B2 | 1/2005 | Watanabe et al. |
| 6,861,632 B2 | 3/2005 | Lee |
| 6,867,402 B1 | 3/2005 | Schulte |
| 6,874,495 B2 | 4/2005 | McFadden |

(56) References Cited

U.S. PATENT DOCUMENTS

| | | | |
|---|---|---|---|
| 6,880,545 B2 | 4/2005 | Heber et al. | |
| 6,884,979 B1 | 4/2005 | Torngren et al. | |
| 6,914,226 B2 | 7/2005 | Ottaway | |
| 6,927,374 B2 | 8/2005 | Hu et al. | |
| 6,982,401 B2 | 1/2006 | Hu et al. | |
| 7,015,443 B2 | 3/2006 | Whipple, Jr. | |
| 7,030,347 B2 | 4/2006 | Lee et al. | |
| 7,053,346 B2 | 5/2006 | Cheng et al. | |
| 7,053,348 B1 | 5/2006 | Terada et al. | |
| 7,055,518 B2 | 6/2006 | McFadden et al. | |
| 7,078,661 B2 | 7/2006 | Kim et al. | |
| 7,080,593 B1 | 7/2006 | Frankel | |
| 7,087,872 B1 | 8/2006 | Dobie et al. | |
| 7,091,460 B2 | 8/2006 | Kinzer | |
| 7,105,787 B2 | 9/2006 | Clemen, Jr. | |
| 7,105,789 B2 | 9/2006 | Ekemar | |
| 7,109,457 B2 | 9/2006 | Kinzer | |
| 7,145,119 B1 | 12/2006 | Kim et al. | |
| 7,166,824 B2 | 1/2007 | Kanzaki et al. | |
| 7,199,341 B2 | 4/2007 | Kaneko et al. | |
| 7,207,486 B1 | 4/2007 | Bennett | |
| 7,208,710 B2 | 4/2007 | Gregoire et al. | |
| 7,235,763 B2 | 6/2007 | Christiaansen et al. | |
| 7,258,881 B2 | 8/2007 | Jones et al. | |
| 7,360,533 B2 | 4/2008 | McFadden | |
| 7,361,866 B2 | 4/2008 | Chun | |
| 7,388,180 B2 | 6/2008 | Kim et al. | |
| 7,409,311 B2 | 8/2008 | Imgram et al. | |
| 7,473,869 B2 | 1/2009 | Chun | |
| 7,490,538 B2 | 2/2009 | Lowell et al. | |
| 7,612,315 B2 | 11/2009 | Corradini | |
| 7,626,468 B2 | 12/2009 | Staines | |
| 7,629,921 B1 | 12/2009 | Manry et al. | |
| 7,994,962 B1* | 8/2011 | Ben-Shmuel | 342/13 |
| 8,207,479 B2* | 6/2012 | Ben-Shmuel et al. | 219/746 |
| 8,389,916 B2* | 3/2013 | Ben-Shmuel et al. | 219/748 |
| 8,759,729 B2* | 6/2014 | Ben-Shmuel et al. | 219/724 |
| 2001/0020616 A1 | 9/2001 | Drozd et al. | |
| 2002/0018138 A1 | 2/2002 | Yoshiro | |
| 2003/0047559 A1 | 3/2003 | Watanabe et al. | |
| 2003/0068414 A1 | 4/2003 | Ito | |
| 2003/0183972 A1 | 10/2003 | Weber et al. | |
| 2004/0074401 A1 | 4/2004 | McMaster et al. | |
| 2004/0134904 A1 | 7/2004 | Clemen, Jr. | |
| 2004/0206755 A1* | 10/2004 | Hadinger | 219/761 |
| 2004/0211765 A1 | 10/2004 | McFadden | |
| 2004/0216732 A1 | 11/2004 | McFadden | |
| 2005/0080373 A1 | 4/2005 | Wang | |
| 2005/0092314 A1 | 5/2005 | Rabas et al. | |
| 2005/0092844 A1 | 5/2005 | Zhang et al. | |
| 2005/0139686 A1 | 6/2005 | Helmer et al. | |
| 2005/0178841 A1 | 8/2005 | Jones, II et al. | |
| 2006/0006173 A1 | 1/2006 | Kim et al. | |
| 2006/0049725 A1 | 3/2006 | Simon | |
| 2006/0186115 A1 | 8/2006 | Joines et al. | |
| 2006/0259547 A1 | 11/2006 | Bogatin et al. | |
| 2006/0278710 A1 | 12/2006 | Park et al. | |
| 2006/0289508 A1 | 12/2006 | Kim | |
| 2006/0289526 A1 | 12/2006 | Takizaki et al. | |
| 2007/0007279 A1 | 1/2007 | Chun et al. | |
| 2007/0007348 A1 | 1/2007 | Shah | |
| 2007/0012690 A1 | 1/2007 | Sim et al. | |
| 2007/0012789 A1 | 1/2007 | Hartney et al. | |
| 2007/0039940 A1 | 2/2007 | Kim et al. | |
| 2007/0039949 A1 | 2/2007 | Wilson | |
| 2007/0137633 A1 | 6/2007 | McFadden | |
| 2007/0215608 A1 | 9/2007 | Yoshino et al. | |
| 2007/0215612 A1 | 9/2007 | Hicks et al. | |
| 2007/0251941 A1 | 11/2007 | Givens | |
| 2007/0272684 A1 | 11/2007 | Lee | |
| 2007/0278218 A1 | 12/2007 | Claesson et al. | |
| 2008/0047948 A1 | 2/2008 | Rosenbloom et al. | |
| 2008/0047959 A1 | 2/2008 | Moriya et al. | |
| 2008/0087662 A1 | 4/2008 | Takizaki et al. | |
| 2008/0105136 A1 | 5/2008 | McFadden | |
| 2008/0105675 A1 | 5/2008 | Choi et al. | |
| 2008/0106483 A1 | 5/2008 | McFadden et al. | |
| 2008/0160967 A1 | 7/2008 | Narasimhan et al. | |
| 2008/0193614 A1 | 8/2008 | Greiner et al. | |
| 2008/0206420 A1 | 8/2008 | McFadden | |
| 2008/0264269 A1 | 10/2008 | Sterzel et al. | |
| 2008/0280000 A1 | 11/2008 | Breunig et al. | |
| 2008/0290087 A1* | 11/2008 | Ben-Shmuel et al. | 219/748 |
| 2008/0290178 A1 | 11/2008 | Reynolds et al. | |
| 2008/0296284 A1 | 12/2008 | McFadden et al. | |
| 2009/0014315 A1 | 1/2009 | Chen | |
| 2009/0045191 A1 | 2/2009 | Ben-Shmuel et al. | |
| 2009/0057302 A1 | 3/2009 | Ben-Shmuel et al. | |
| 2009/0071110 A1 | 3/2009 | Gonze et al. | |
| 2009/0236333 A1 | 9/2009 | Ben-Shmuel et al. | |
| 2009/0236334 A1 | 9/2009 | Ben-Shmuel et al. | |
| 2009/0236335 A1 | 9/2009 | Ben-Shmuel et al. | |
| 2009/0256706 A1 | 10/2009 | Brown | |
| 2009/0274802 A1 | 11/2009 | Kling et al. | |
| 2010/0123001 A1 | 5/2010 | Park | |
| 2010/0155392 A1 | 6/2010 | Nordh et al. | |
| 2010/0176121 A1 | 7/2010 | Nobue et al. | |
| 2010/0176123 A1* | 7/2010 | Mihara et al. | 219/746 |
| 2010/0224623 A1* | 9/2010 | Yasui et al. | 219/702 |
| 2010/0237067 A1 | 9/2010 | Nordh et al. | |
| 2010/0252551 A1 | 10/2010 | Nordh et al. | |
| 2011/0108548 A1* | 5/2011 | Nobue et al. | 219/702 |
| 2011/0168699 A1* | 7/2011 | Oomori et al. | 219/748 |
| 2011/0198343 A1* | 8/2011 | Bilchinsky | H05B 6/688 219/678 |
| 2012/0103972 A1 | 5/2012 | Okajima | |
| 2012/0152940 A1* | 6/2012 | Oomori | H05B 6/686 219/702 |
| 2013/0008896 A1* | 1/2013 | Oomori | H05B 6/686 219/756 |
| 2013/0062334 A1* | 3/2013 | Bilchinsky et al. | 219/482 |
| 2013/0146590 A1* | 6/2013 | Einziger et al. | 219/709 |
| 2014/0063676 A1* | 3/2014 | Sigalov | H05B 6/645 361/143 |

FOREIGN PATENT DOCUMENTS

| | | |
|---|---|---|
| DE | 102007025245 | 10/2007 |
| DE | 102007025262 | 10/2007 |
| DE | 102007025263 | 10/2007 |
| DE | 102007025264 | 10/2007 |
| DE | 102007035357 | 2/2009 |
| DE | 102007035359 | 2/2009 |
| DE | 102007051638 | 8/2009 |
| EP | 0268379 | 5/1988 |
| EP | 0296527 | 12/1988 |
| EP | 0429822 | 6/1991 |
| EP | 0615763 | 9/1994 |
| EP | 0752195 | 1/1997 |
| EP | 0934681 | 8/1999 |
| EP | 1174667 A1 | 1/2002 |
| EP | 1515102 | 3/2005 |
| EP | 1708118 A2 | 10/2006 |
| EP | 2 051 564 | 8/2007 |
| EP | 2 205 043 | 10/2008 |
| EP | 2053315 | 4/2009 |
| EP | 2098788 | 9/2009 |
| GB | 1465106 | 2/1977 |
| GB | 2391154 | 1/2004 |
| JP | 52-014946 | 2/1977 |
| JP | 63-255783 A | 10/1988 |
| JP | 1-159388 U1 | 11/1989 |
| JP | 04-259789 | 9/1992 |
| JP | 04-299282 | 10/1992 |
| JP | 6-193884 A | 7/1994 |
| JP | 06-215871 | 8/1994 |
| JP | 06-251866 | 9/1994 |
| JP | 6-310268 | 11/1994 |
| JP | 06-310268 | 11/1994 |
| JP | 8-64359 | 3/1996 |
| JP | 9-229372 | 9/1997 |
| JP | 10-196966 | 7/1998 |
| JP | 2001-086967 | 4/2001 |

(56) References Cited

FOREIGN PATENT DOCUMENTS

| | | |
|---|---|---|
| JP | 2002-37420 A1 | 2/2002 |
| JP | 2002-243161 A1 | 8/2002 |
| JP | 2002-280159 | 9/2002 |
| JP | 2004-171852 | 6/2004 |
| JP | 2005-228604 | 8/2005 |
| JP | 2008-034244 | 2/2008 |
| JP | 2008-269793 | 11/2008 |
| JP | 2008-310969 | 12/2008 |
| JP | 2009-259511 | 11/2009 |
| WO | WO 91/07069 | 5/1991 |
| WO | WO 95/27387 | 10/1995 |
| WO | WO 95/27388 | 10/1995 |
| WO | WO 97/36728 | 10/1997 |
| WO | WO 98/35532 | 8/1998 |
| WO | WO 99/13688 | 3/1999 |
| WO | WO 00/36880 | 6/2000 |
| WO | WO 02/23953 | 3/2002 |
| WO | WO 03/056919 | 7/2003 |
| WO | WO 2004/054705 A1 | 7/2004 |
| WO | WO 2004/059563 | 7/2004 |
| WO | WO 2005/027644 | 3/2005 |
| WO | WO 2005/041672 | 5/2005 |
| WO | WO 2005/073449 | 8/2005 |
| WO | WO 2008/102360 | 8/2005 |
| WO | WO 2006/016372 | 2/2006 |
| WO | WO 2007/018565 | 2/2007 |
| WO | WO 2007/095904 | 8/2007 |
| WO | WO 2007-096877 | 8/2007 |
| WO | WO 2007/096877 | 8/2007 |
| WO | WO 2007/096878 A2 | 8/2007 |
| WO | WO 2005/106333 | 9/2007 |
| WO | WO 2008/007368 | 1/2008 |
| WO | WO 2008-018466 | 2/2008 |
| WO | WO 2008/048497 | 4/2008 |
| WO | WO 2008/087618 | 7/2008 |
| WO | WO 2008/102334 | 8/2008 |
| WO | WO 2008/143942 | 11/2008 |
| WO | WO 2008/145213 | 12/2008 |
| WO | WO 2008/145214 | 12/2008 |
| WO | WO 2008/145216 | 12/2008 |
| WO | WO 2008/145217 | 12/2008 |
| WO | WO 2009-050893 | 4/2009 |
| WO | WO 2009/080344 | 7/2009 |
| WO | WO 2009/104191 | 8/2009 |
| WO | WO 2010/052724 | 5/2010 |
| WO | WO 2010/052725 | 5/2010 |
| WO | WO 2010/147439 A2 | 12/2010 |

OTHER PUBLICATIONS

Second Notice of Opposition filed by Dr. Felix Gross Europe s.r.l. in EP2356879, dated Aug. 21, 2013, 14 pages.
Invitation to Indicate Subject Matter to be searched for European Patent Application No. 12197455.4 dated May 29, 2013, 3 pages.
Invitation to Indicate Subject Matter to be searched for European Patent Application No. 12182015.3, dated Feb. 5, 2013, 5 pages.
International Preliminary Report on Patentability issued in International Application No. PCT/IL2010/000380, dated May 15, 2012, 7 pages.
European Search Report issued in European Patent Application No. 12197455.4, dated Sep. 18, 2013, 7 pages.
First Notice of Opposition filed by Whirlpool Europe s.r.l. in EP2356879, dated Jul. 22, 2013, 18 pages.
Second Notice of Opposition filed by Whirlpool Europe s.r.l. in EP2356879, dated Aug. 21, 2013, 14 pages.
International Preliminary Report on Patentability and Written Opinion Dated Aug. 26, 2008 From the International Preliminary Examining Authority Re.: Application No. PCT/IL2007/000235.
International Preliminary Report on Patentability Dated May 29, 2008 From the International Preliminary Examining Authority Re.: Application No. PCT/IL2007/000236.
International Search Report and Written Opinion Dated Sep. 11, 2007 From the International Searching Authority by the Patent Cooperation Treaty Re.: Application No. PCT/IL2007/000235.
International Search Report and Written Opinion Dated Nov. 13, 2008 From the International Searching Authority Re.: Application No. PCT/IL2008/000231.
International Search Report and Written Opinion Dated May 20, 2008 From the International Searching Authority by the Patent Cooperation Treaty Re.: Application No. PCT /IL2007/001073.
International Search Report and Written Opinion Dated Aug. 31, 2007 From the International Searching Authority by the Patent Cooperation Treaty Re.: Application No. PCT/IL20007/000236.
International Search Report and Written Opinion Dated Dec. 27, 2007 From the International Searching Authority by the Patent Cooperation Treaty Re.: Application No. PCT/IL2007/000864.
Lapin N9GL's RF Safety Column: The Military's New RF Weapon, ARRL Handbook for Radio Amateurs, ARRL Web: N9GL's RF Safety Column: The Military's New RF Weapon.
International Preliminary Report on Patentability and Written Opinion Dated Aug. 26, 2009 From the International Bureau of WIPO Re.: Application No. PCT/IL2007/001073.
International Search Report and the Written Opinion Dated Nov. 25, 2009 From the International Searching Authority Re.: Application No. PCT/IL2009/000199.
International Search Report and Written Opinion Dated Mar. 3, 2010 From the International Searching Authority Re.: Application No. PCT/IL2009/001057.
Response Dated Feb. 23, 2010 to the Written Opinion of Nov. 25, 2009 From the International Searching Authority Re.: Application No. PCT/IL2009/000199.
Penfold et al. "Control of Thermal Runaway and Uniformity of Heating in the Electromagnetic Rewarming of a Cryopreserved Kidney Phantom", Cryobiology, 30: 493-508, 1993.
Adams "Microwave Blood Plasma Defroster", Journal of Microwave Power and Electromagnetic Energy, 26(3): 156-159, 1991.
Arens et al. "Danger of Over warming Blood by Microwave", JAMA, 218(7): 1045-1046, 718, Nov. 15, 1971.
Collin "Electromagnetic Theory: Wave Equation", Foundations for Microwave Engineering, IEEE Press Series on Electromagnetic Wave Theory, 2nd Ed., Chap.2.4: 31-32, 2001.
Collin "Transmission Lines and Waveguides", Foundations for Microwave Engineering, IEEE Press Series on Electromagnetic Wave Theory, 2nd Ed., p. 96-99, 2001.
Geedipalli et al. "Heat Transfer in a Combination Microwave-Jet Impingement Oven", Food and Bioproducts Processing, 86: 53-63, 2008.
Hirsch et al. "Indicators of Erythocyte Damage After Microwave Warming of Packed Red Blood Cells", Clinical Chemistry, 49(5): 792-799, 2003.
Hirsch et al. "Temperature Course and Distribution During Plasma Heating With a Microwave Device", Anaesthesia, 58: 444-447, 2003.
Khummongkol et al. "Heat Transfer Between Impinging Air and Impinged Surface: A Factorial Design", The Joint International Conference on 'Sustainable Energy and Environment (SEE)', Hua Hin, Thailand, Dec. 1-3, 2004, 4-003(O): 431-436, 2004.
Marcroft et al. "Flow Held in a Hot Air Jet Impingement Oven—Part I: A Single Impinging Jet", Journal of Food Processing Preservation, 23: 217-233, 1999.
Marcroft et al. "Flow Field in a Hot Air Jet Impingement Oven—Part II: Multiple Impingement Jets", Journal of Food Processing Preservation, 23: 235-248, 1999.
Risco "Microwaves and Vascular Perfusion: Obtaining Very Rapid Organ Cooling", Cryobiology, 49: 294, Abstract No. 11, 2004.
Robinson et al. "Electromagnetic Re-Warming of Cryopreserved Tissues: Effect of Choice of Cryoprotectant and Sample Shape on Uniformity of Heating", Physics in Medicine and Biology. 47: 2311-2325, 2002.
Sherman et al. "A New Rapid Method for Thawing Fresh Frozen Plasma", Transfusion, 14(6): 595-597, Nov.-Dec. 1974.
Söhngen et al "Thawing of Fresh-Frozen Plasma With a New Microwave Oven", Transfusion, 28(6): 576-580, 1988.

(56) References Cited

OTHER PUBLICATIONS

Communication Pursuant to Article 94(3) EPC Dated Apr. 29, 2010 From the European Patent Office Re.: Application No. 07706172.9.
Kim, J. et al., "Novel Microstrip-to-Stripline Transitions for Leakage Suppression in Multilayer Microwave Circuits."
Kusama, Y. et al., "Size Reduction of the Door Seal Structure of a Microwave Oven by the FDTD Method," *Electronics and Communications in Japan*, Part 2, vol. 86, No. 10, 2003.
Kusama, Y. et al., "A Study on the Door Seal Structure of a Microwave Oven Using the Finite-Difference Time-Domain Method," *Microwave and Optical Technology Letters*, vol. 19, No. 5, Dec. 5, 1998.
Kusama, Y. et al., "Analysis of Door Seal Structure of Microwave Oven with Consideration of Higher Modes by the FDTD Method," *Electronics and Communications in Japan*, Part 2, vol. 85, No. 3, 2002.
Lee, G. et al., "Suppression of the CPW Leakage in Common Millimeter-Wave Flip-Chip Structures," *IEEE Microwave and Guided Wave Letters*, vol. 8, No. 11, Nov. 11, 1998.
Matsumoto, K. et al., "An Analysis of a Door Seal Structure of a Microwave Oven with an Inserted Sheet-Type Lossy Material Using FDTD Method," *Electronics and Communications in Japan*, Part 1, vol. 85, No. 9, 2002.
Matsumoto, K. et al., "An efficient Analysis on Door structure of Microwave Oven Using Combined waves of High Order Modes," *33rd European Microwave Conference*, Munich, 2003.
Mett, R. R. et al., "Microwave leakage from field modulation slots in TE011 electron paramagnetic resonance cavities," *Review of Scientific Instruments* 76, 014702, 2005.
Rabinovitch, J., "New Design for the Mk Irf Finger Contacts in the LHC."
Rocha, A. M. et al., "Optimization of a door seal structure of a microwave oven using a FDTD method," *International Journal of Numerical Modeling: Electronic Networks, Devices and Fields*, Int. J. Numer. Model. 2008; 21:507-513, Jul. 21, 2008.
Swain et al., "What is the most energy efficient method of cooking a 'British' roast dinner?," *University of Bristol Fryers Research Project*, Feb. 29, 2008.
Tomiyasu, K., "Minimizing Radiation Leakage from Microwave Ovens," *IEEE Microwave Magazine*, Feb. 1, 2008.
Umashankar, K. et al., "A Novel Method to Analyze Electromagnetic Scattering of Complex Objects," *IEEE Transactions on Electromagnetic Compatibility*, vol. EMC-24, No. 4, Nov. 1, 1982.
Umishita, K. et al., "Absorption and Shielding Effect of Electromagnetic Wave at GHz Frequency by Multi-walled Carbon Nanotube/Polymer Composites," *Proceedings of the 9th European Conference on Wireless Technology*, Sep. 1, 2006.
Collin, R.E., "Chapter 4: Circuit Theory for Waveguiding Systems," *Foundations of Microwave Engineering*, 2nd ed. IEEE Press Series on electromagnetic wave theory, pp. 233-254, 2001.
Pozar, D.M., "Chapter 4: Microwave Network analysis," *Microwave Engineering*, 2nd ed., John Wiley & Sons, Inc., pp. 190-211, 1998.
International Search Report and the Written Opinion Dated Jun. 24, 2010 From the International Searching Authority Re.: Application No. PCT/IL2009/001059.
International Preliminary Report on Patentability and Written Opinion Dated Jan. 13, 2009 From the International Bureau of WIPO Re.: Application No. PCT/IL2007/000864.
Bird "Antenna Feeds", Encyclopedia of Radiofrequency and Macrowave Engineering, p. 185-217, 2005.
Boström et al. "Rapid Thawing of Fresh-Frozen Plasma With Radio Wave-Based Thawing Technology and Effects on Coagulation Factors During Prolonged Storage at 4° C.", Vox Sanguinis, 97: 34-35, 2009.
Evans "Electromagnetic Rewarming: The Effect of CPA Concentration and Radio Source Frequency on Uniformity and Efficiency of Heating", Cryobiology, 40: 126-138, 2000.

Evans et al. "Design of a UHF Applicator for Rewarming of Cryopreserved Biomaterials", IEEE Transactions on Biomedical Engineering, 39(3): 217-225, Mar. 1992.
Foster et al. "Biological Effects of Radiofrequency Energy as Related to Health and Safety", Encyclopedia of Radiofrequency and Macrowave Engineering, p. 511-523, 1999.
Foster et al. "Dielectric Properties of Tissues", Handbook of Biological Effects of Electromagnetic Fields, CRC Press, 2nd Ed.(Chap.I): 25-101, 1996.
Hambling "Forget Lasers, Phasers and Other Beam Weapons—Radiofrequency Devices Are Here, and They're Set to 'Sting'", Tech Watch: Forecasting Pain, 183(12): 32, Dec. 2006.
Herring et al. "OSU Tunes Into a Cooking Innovation", OSU News & Communication Services, Oregon State University, 2 P., Apr. 30, 2004.
Liang et al. "Multiband Characteristics of Two Fractal Antennas", Microwave and Oprical Technology Letters, 23(4): 242-245, Nov. 20, 1999.
Repacholi "Radiofrequency Electromagnetic Field Exposure Standards", IEEE Engineering in Medicine and Biology Magazine, p. 18-21, Mar. 1987.
Robinson et al. "Rapid Electromagnetic Warming of Cells and Tissues", IEEE Transactions on Biomedical Engineering, 46(12): 1413-1425, Dec. 1999.
Schwan et al. "RF-Field Interactions With Biological Systems: Electrical Properties and Biophysical Mechanisms", Proceedings of the IEEE, 68(1): 104-113, Jan. 1980.
Scott "Understanding Microwaves", A Wiley-Interscience Publication, 1: 326-331, 1993.
Shelley "Inside View on Deep Heat", Eureka Innovative Engineering Design, 2 P., May 14, 2007.
Von Hippel "Theory: A. Macroscopic Properties of Dielectrics. Comples Permittivity and Permeability", Dielectric Materials and Applications, 1: 3-5, 1995.
Walker et al. "Fractal Volume Antennas", Electronics Letters, 34(16): 1536-1537, Aug. 6, 1998.
Wusteman et al. "Vitrification of Large Tissues With Dielectric Warming: Biological Problems and Some Approaches to Their Solution", Cryobiology, 48: 179-189, 2004.
Notice of Defects issued from the Israeli Patent Office in corresponding Israeli Patent Application No. 193581, dated Sep. 26, 2011, 2 pgs (including translation).
International Search Report and Written Opinion regarding International Application No. PCT/IL10100380, mailed Aug. 30, 2010, 12 pages.
International Search Report and Written Opinion regarding International Application No. PCT/IL10100381, mailed Sep. 1, 2010, 124 pages.
International Search Report and Written Opinion Dated Jun. 15, 2010 From the International Searching Authority Re.: Application No. PCT/IL2009/001058.
International Preliminary Report on Patentability and Written Opinion Dated Aug. 26, 2009 From the International Preliminary Examining Authority Re.: Application No. PCT/IL2008/000231.
Official Action Dated Nov. 10, 2011 From the US Patent and Trademark Office Re.: U.S. Appl. No. 12/899,348.
Official Action Dated Jun. 28, 2011 From the US Patent and Trademark Office Re.: U.S. Appl. No. 12/222,948.
Official Action Dated Nov. 22, 2011 From the US Patent and Trademark Office Re.: U.S. Appl. No. 12/907,663.
Official Action Dated Jul. 14, 2010 From the State IP Office, P.R. China Re.: Application No. 200780014028.9, 9 pages (including translation).
English Translation of Notice of Reason for Rejection, mailed Feb. 24, 2012 Re: Japanese Application No. 2008-555943, 5 pages.
Communication Pursuant to Article 94(3) EPC, dated Mar. 26, 2012 Re: European Application No. 09 793 620.7-2214, 5 pages.
EPO Communication in corresponding EP Application No. 12182015.3, dated Feb. 26, 2014, 7 pages.
Notice of Reason for Rejection issued by the Japanese Patent Office on Feb. 6, 2013 in corresponding Japanese Application No. JP 2011-535209, 3 pages.

(56) References Cited

OTHER PUBLICATIONS

Office Action issued by the Chinese State Intellectual Property Office on Dec. 21, 2012 in corresponding Chinese Application No. 200980154040.9, 11 pages.
J.R. Bows, "Variable Frequency Microwave Heating of Food", *Journal of Microwave Power and Electromagnetic Energy*, 34(4): 227-238, Jan. 1, 1999, XP055102944.
First Office Action dated Dec. 18, 2013 in a related Chinese Application No. 201080050438.0.
Second Office Action dated Sep. 2, 2014 in a related Chinese Application No. 201080050438.0.
Extended European Search Report in a related European Application No. 10829614.6 dated Nov. 27, 2014.
English Translation of Japanese Office Action mailed Feb. 14, 2014 in a related Japanese Application No. 2012-538460.

* cited by examiner

DEVICE AND METHOD FOR CONTROLLING ENERGY

RELATED APPLICATIONS

This is a continuation of application Ser. No. 13/508,940, filed May 9, 2012, which claims the benefit of 1) International Application No. PCT/IL2010/000380 entitled "Device and Method For Controlling Energy," filed on May 12, 2010; 2) International Application No. PCT/IL2009/001057 entitled "Device and Method For Controlling Energy," filed on Nov. 10, 2009; 3) U.S. Provisional Patent Application No. 61/282,981, entitled "Modal Analysis," filed on May 3, 2010; 4) U.S. Provisional Patent Application No. 61/282,983, entitled "Loss Profile Analysis," filed on May 3, 2010; and 5) U.S. Provisional Patent Application No. 61/282,980, entitled "Spatially Controlled Energy Delivery," filed on May 3, 2010. All of these listed applications are fully incorporated herein by reference in their entirety.

The present application is related to four other U.S. Provisional Patent Applications 1) U.S. Provisional Application No. 61/282,985, entitled "Modal Energy Application," filed on May 3, 2010; 2) U.S. Provisional Application No. 61/282,986, entitled "Degenerate Modal Cavity," filed on May 3, 2010; 3) U.S. Provisional Application No. 61/282,982, entitle "Partitioned Cavity," filed on May 3, 2010; and 4) U.S. Provisional Application No. 61/282,984, entitled "Antenna Placement in an Electromagnetic Energy Transfer System," filed on May 3, 2010. All of these listed applications are fully incorporated herein by reference in their entirety.

FIELD OF THE INVENTION

The present application, in some embodiments thereof, is concerned generally with dissipation of electromagnetic (EM) energy in a load, and more particularly but not exclusively with RF heating, for example using microwave or UHF energy for thawing, heating and/or and cooking.

BACKGROUND OF THE INVENTION

Heating objects using high frequency radiation is wide spread, and comprises the commonly used domestic microwave (MW) oven, as well as commercial ovens that use MW energy, mainly in combination with other means of heating, such as steam, hot air and infrared heating elements.

Among the many problems associated with known MW ovens is a lack of uniformity in heating, which often results in hot spots and cold spots that reflect the standing wave within the cavity. Many of the attempts to improve uniformity in such devices included increasing the number of modes within the cavity (e.g. by mode stirring and/or moving the load during heating).

In some cases, where multiple frequencies were used, the devices were configured to measure the efficiency of energy transfer into the cavity at different transmitted frequencies and then to transmit energy to the load only at frequencies having a relatively high efficiency, with the intent that this should increase the efficiency of energy transfer into the load.

Heating an object changes its dissipation characteristics at different frequencies. For example, a frequency that is dissipated in the load at one rate before heating may dissipate at a different rate (higher or lower) after some heating or movement of the load took place.

SUMMARY OF THE INVENTION

According to some embodiments there is provided an apparatus and a method for irradiating a load with an irradiation spectrum of frequencies. Irradiating is performed by transmitting different amounts of energy at different frequencies. The amount of energy transmitted at each frequency is controlled by at least by varying respective durations during which corresponding frequencies are transmitted.

According to one aspect of the present embodiments, a method of irradiating a load is provided in which different amounts of energy are supplied at different frequencies by varying the respective durations during which corresponding frequencies are transmitted. Hence a frequency which from which much energy is required is transmitted for a longer amount of time and a frequency from which little energy is required is transmitted for a shorter amount of time.

Irradiating the load may be performed in a resonance cavity.

Irradiating the load may be controlled for obtaining a predetermined energy dissipation pattern in the load.

Irradiating the load may be performed at a fixed power transmission level.

Irradiating the load may be performed at a maximal power transmission level for each of the transmitted frequencies respectively. Keeping the amplifier working at a design maximum power allows for cheaper amplifiers to be used.

Irradiating the load may be controlled for limiting the maximum amount of energy provided at each of the different frequencies.

Irradiating the load may be controlled for limiting the overall amount of energy provided at the different frequencies for a period of transmission.

A period of transmission may be a transmission cycle or a duty cycle.

Irradiating the load may be controlled for limiting the overall durations during which individual frequencies are transmitted.

Irradiating the load may be controlled for maximizing the possible power at each of the transmitted frequencies.

At least two frequencies are transmitted at at least two different non-zero powers.

The method may comprise:
irradiating the load with the irradiation spectrum of frequencies;
measuring a resulting reflected and coupled spectrum (RC spectrum);
inferring current dissipation information of the load in view of the RC spectrum; and
setting the irradiation spectrum of frequencies to accord with the dissipation information wherein the setting comprises transmitting different amounts of energy at different frequencies by varying respective durations during which corresponding frequencies are transmitted.

The method may comprise:
irradiating the load with the irradiation spectrum of frequencies, such that energy is absorbed by the load;
measuring a resulting RC spectrum;
inferring current dissipation information of the load in view of the measured RC spectrum; and
modifying the irradiation spectrum of frequencies to accord with the dissipation information wherein the modifying comprises transmitting different amounts of energy at different frequencies by varying respective durations during which corresponding frequencies are transmitted.

The frequencies may be arranged in a series to form a duty cycle.

The method may comprise repetitively performing the duty cycle.

The frequencies are varied within the duty cycle.

The method may comprise switching frequencies differentially on or off over repetitions of the duty cycle to vary overall durations of irradiation at respective frequencies of irradiation of the load.

In the method, differential switching may be achieved by switching a frequency off for some of the cycles or to a lower power for some of the cycles.

According to a second aspect of the present embodiments there is provided a method for irradiating a load with an irradiation spectrum of frequencies, the load having dissipation information which varies as a function of an energy dissipation state of the load, the method comprising modifying the irradiation spectrum of frequencies to accord with the varying of the dissipation information wherein the modifying comprises varying respective durations during which corresponding frequencies are transmitted.

According to a third aspect of the present embodiments there is provided apparatus for irradiating a load, comprising:

a. an energy feed functional for transmitting energy to a cavity for resonating in the presence of the load in a plurality of frequencies; and b. a controller functional for varying respective durations during which corresponding frequencies are transmitted.

In an embodiment, the controller is configured to carry out the varying repeatedly.

In an embodiment, the controller is configured to irradiate the load with the irradiation spectrum of frequencies according to the respective durations, to measure a resulting reflected and coupled spectrum (RC spectrum), to infer current dissipation information of the load in view of the RC spectrum, and to set the irradiation spectrum of frequencies to accord with the dissipation information.

In an embodiment, the controller is configured to switch frequencies differentially on or off over repetitions of a duty cycle of the frequencies, thereby to vary overall duration of respective frequencies in the irradiating the load.

Some exemplary embodiments may include an apparatus for applying EM energy to a load. The apparatus may include at least one processor configured to receive information indicative of energy dissipated by the load for each of a plurality of modulation space elements, a term to be described in greater detail below. The processor may also be configured to associate each of the plurality of modulation space elements with corresponding time duration of power application, based on the received information. The processor may be further configured to regulate energy applied to the load such that for each of the plurality of modulation space elements, power is applied to the load at the corresponding time duration of power application.

Other exemplary embodiments may include an apparatus for applying EM energy to a load. The apparatus may include at least one processor configured to determine a plurality of values of dissipation indicators associated with the load. The processor may also be configured to set modulation space element/power/time triplets based on the plurality of values of dissipation indicators. The processor may further be configured to regulate application of the modulation space element/power/time triplets to apply energy to the load.

Other exemplary embodiments may include a method for applying EM energy to a load. The method may include receiving information indicative of energy dissipated by the load for each of a plurality of modulation space elements; associating each of the plurality of modulation space elements with a corresponding time duration of power application, based on the received information; and regulating energy applied to the load such that for each of the plurality of modulation space elements, power is applied to the load at the corresponding time duration of power application.

In the present disclosure, many of the concepts have been described in conjunction with frequencies and/or modulation space elements. In some embodiments, frequency may be included among one or more parameters used to define or manipulate a modulation space element. In general, therefore, concepts relating to the presently disclosed embodiments that are described in terms of frequency may also extend more generally to embodiments that include the use of modulation space elements.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof. This refers in particular to tasks involving the control of the equipment such as a microwave, dryer and the like. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF EXEMPLARY EMBODIMENTS

Figure 1A:
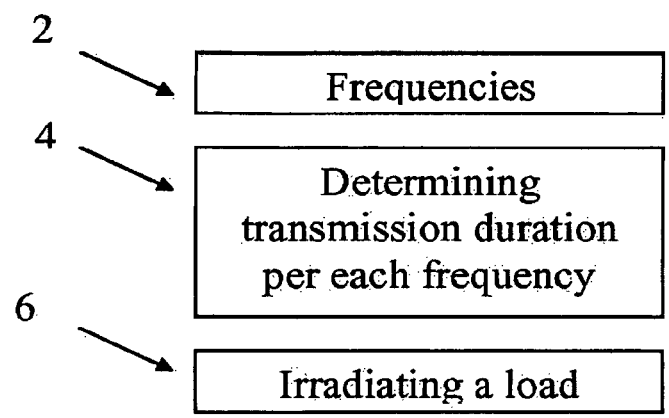
FIG. 1A is a simplified flow chart illustrating a method for of irradiating a load according to some embodiments of the present invention.

The present embodiments comprise an apparatus and a method for controlling the amount of EM energy that dissipates into a load at each transmitted modulation space element (MSE; as will be described below in detail) and in particular, to such a controlling through modulation of the period in which each MSE is transmitted, particularly within a duty cycle of the MSEs. The dissipation of energy may be used, for example, for any form of heating utilizing irradiation of energy, at times without a temperature increase, including one or more of thawing, defrosting, warming, cooking, drying etc. The term "electromagnetic energy" or "EM energy", as used herein, includes any or all portions of the electromagnetic spectrum, including but not limited to, radio frequency (RF), infrared (IR), near infrared, visible light, ultraviolet, etc. In one particular example, applied electromagnetic energy may include RF energy with a wavelength in free space of 100 km to 1 mm, which is a frequency of 3 KHz to 300 GHz, respectively. In some other examples, the frequency bands may be between 500 MHz to 1500 MHz or between 700 MHz to 1200 MHz or between 800 Mhz-1 GHz. Microwave and ultra high frequency (UHF) energy, for example, are both within the RF range. Even though examples of the invention are described herein in connection with the application of RF energy, these descriptions are provided to illustrate a few exemplary principles of the invention, and are not intended to limit the invention to any particular portion of the electromagnetic spectrum.

PCT patent applications No WO2007/096877 ('877) and WO2007/096878 ('878), both by Ben-Shmuel et al. (both published on Aug. 3, 2007) herein incorporated by reference, disclose methods and devices for electromagnetic heating. Some disclosed methods comprise the steps of placing an object to be heated into a cavity and feeding UHF or microwave energy into the cavity via a plurality of feeds and at a plurality of frequencies.

PCT patent application No WO2008/102,360 ('360) by Ben Shmuel et al, published on Aug. 28, 2008, herein incorporated by reference, discloses, inter alia, a method for drying an object comprising applying broadband RF energy to an object in a cavity, in a controlled manner which keeps the object within a desired temporal temperature schedule and within a desired spatial profile; and terminating the drying when it is at least estimated that a desired drying level is achieved.

PCT patent application No WO2008/102,334 ('334) by Ben Shmuel et al, published on Aug. 28, 2008, herein incorporated by reference, discloses, inter alia, a method for freezing a body or a portion of a body. The method comprises exposing at least a part of the body to a coolant having a temperature below the freezing point of the body, and at the same time operating an electromagnetic heater, as to maintain the at least part of the body at a temperature above its freezing point; and reducing the electromagnetic heating to allow the at least a part of the body to freeze. The electromagnetic heater comprises a resonator, and the heated part of the body is heated inside the resonator.

The aforementioned methods of the '877, '878 and '334 applications take into account the dissipation ratio at each transmitted frequency and the maximal amount of power that may be transmitted at that frequency. The methods aim, at times, to deduce the amount of energy that is to be transmitted at each frequency such that only a desired amount of energy is dissipated.

The aforementioned methods of the '877, '878 and '334 applications further disclose the option of transmitting power only (or primarily) in bands that primarily dissipate in the load. Such transmission may be used, for example, to avoid or significantly reduce dissipation into surface currents or between multiple feeds (i.e., antennas). The transmission can be performed, for example, such that the power dissipated in the object is substantially constant for all transmitted frequencies (which may be termed a homogeneous energy dissipation pattern in the load). Such a transmission allows an essentially equal dissipation of energy per frequency in the load, regardless of the load's composition and/or geometry, while the power fed and efficiency of energy transfer may be different for different frequencies.

According to some embodiments of the present invention, a method is provided for irradiating a load with a spectrum of frequencies or MSEs, measuring a resulting reflected and coupled spectrum ("RC spectrum"), inferring from the RC spectrum the spectral dissipation of the load as it is modified over the course of the irradiation, and modifying the irradiation spectrum in response to the changing dissipation spectrum. "Spectral dissipation" or "dissipation information" of a load may be taken to mean the dissipation ratios of a plurality of transmitted frequencies or MSEs in the load.

Alternatively or additionally, modifying the irradiation is performed by dynamically adjusting one or more parameters for controlling the amount of energy that dissipates into a load at each transmitted frequency in a duty cycle. The adjustment is based on spectral information retrieved from the load. Spectral information may comprise and/or be derived from one or more of the RC spectrum the full S parameters of the device, the spectral dissipation of the load, the dissipation ratios of transmitted frequencies or MSEs in the load, the Q factor associated with dissipation peaks, and/or the maximal power that may be transmitted into the cavity at each such frequency or MSE). Such parameters for controlling the heating may be or include the time allotted per each frequency and/or the power assigned for each frequency and the like.

According to some embodiments of the present invention the transmittal time for each frequency or MSE is adjusted such that a desired energy is dissipated into the load at any given frequency or MSE. In such a protocol, the time of transmission may be used to compensate for cases having a relatively low energy dissipation ratio and/or low maximal power input by assigning more time for such frequencies or MSEs (e.g. if a high relative energy transmission is desired for such frequencies in a given cycle). The energy that is dissipated in a load at a given frequency or MSE may be controlled to achieve a desired dissipation pattern in the load. Accordingly, the desired energy may be, for example, an absolute value per frequency or MSE or a relative value (as compared to another transmitted frequency or MSE) or a combination of both. It may also be related to the total amount of energy that should be dissipated in a plurality of frequencies or MSEs and the pattern (relative dissipation ratio) between them. A dissipation pattern in the load means the relative and/or absolute amount of energy that needs to be dissipated in a load that is exposed to irradiation at each frequency or a plurality of frequencies or MSEs. The pattern may be frequency or MSE related (e.g., dissipate a given or relative amount by a frequency or MSE) and/or site related (e.g., dissipate a given or relative amount into a site in the load) or another parameter or characteristic of the spectral information (possibly across the whole working band). For example—a dissipation pattern may be homogeneous (essentially the same amount of energy to be dissipated by a plurality of frequencies or MSEs and/or at a plurality of sites). For example, for homogeneous energy dissipation, all, or a significant majority (e.g. 51% or more, 60% or more, 80% or more, or even 95% or more), of the dissipated energy values for each frequency in a heating cycle must be similar (e.g., maximum difference lower than 40%, 20%, 10%, 5% of the mean value). In other patterns, a different relation may exist. For example, in some protocols that may be used for thawing, a relatively small amount of energy (if any) may be dissipated in the load for frequencies or MSEs having a high dissipation ratio, while a relatively large amount of energy may be dissipated in the load for frequencies or MSEs having a low dissipation ratio. An energy dissipation pattern may comprise one or more of (a) homogeneous energy dissipation in the load, (b) controlled, non-homogeneous energy dissipation in the load or (c) a combination thereof. The dissipation pattern may be chosen per irradiation cycle or it may be chosen for a plurality of cycles or even the whole process.

A time adjusted method may enable a reduction in the overall process time in comparison to adjusting only the power input at each frequency or MSE (e.g., where the transmission time per frequency or MSE is fixed) since a higher power level (at least in some frequencies or MSEs) becomes possible. Optionally, highest power level (as a function of frequency or MSE) is transmitted at all frequencies or MSEs, maximizing (for given spectral situation and power source) the energy dissipation ratio, thus minimizing the time. The controlling of the time may be performed one or more times during heating, for example, before each duty cycle, and/or before and/or after a plurality of duty cycles, and may be based on spectral information or dissipation information retrieved from the cavity and/or the load. The control may encompass, for example, the control of the device over the different frequencies or MSEs to ensure that each frequency or MSE is transmitted at a power and duration as necessary. At times, control may also encompass the change of transmission patterns, for example, between cycles and, at times, also respective calculations and/or decision making processes.

Additionally, or alternatively, the maximal possible power at each transmitted frequency or MSE is transmitted for that frequency or MSE, while controlling the time period of transmission for that frequency or MSE. Such transmission results in dissipating a desired amount of energy at the given frequency or MSE into the load. Such transmission results in an increase or even maximization of the dissipated power (or rate of energy transfer to the load) while achieving a desired energy dissipation pattern. Additionally or alternatively a reduction or even minimization of the time needed for dissipating any given amount of energy using a given energy dissipation pattern is achieved. Surprisingly, energy transfer at the maximal possible power at carefully chosen frequencies or MSEs over the spectrum does not cause damage to the object, although the transfer of energy at one frequency or MSE may affect the load's dissipation of a consequently transmitted frequency or MSE.

According to some embodiments of the present invention, the time allotted for transmission of each frequency or MSE is fixed for all transmitted frequencies or MSEs within a duty cycle while the frequencies or MSEs that appear in each cycle are dynamically selected, so that summation over many cycles may provide a desired dissipation pattern, according to spectral information and/or dissipation information retrieved from the cavity and/or load. The embodiment is explained in greater detail in FIG. 5 and its associated description.

According to some embodiments of the present invention, the time allotted for transmission of each frequency or MSE may be fixed for all transmitted frequencies or MSEs within a duty cycle while the power is dynamically adjusted over a series of duty cycles so that a desired heating pattern is achieved over the series of cycles (a preset group of cycles). In such cases, it may be possible to transmit each frequency repeated cycle within the group of cycles, until the desired energy is dissipated by that frequency or MSE. The transmission power for each frequency or MSE may be maximal for at least a portion of the cycles within the group of cycles, such that a desired amount of energy is dissipated in total by the frequency or MSE. At times, this means that the frequency or MSE may be transmitted at maximal power during some of the cycles within a group and at a lower power (or even not at all) for one or more cycles within a group. The controlling of the power may be based on spectral information and/or dissipation information retrieved from the cavity and/or load.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

FIG. 1A is a simplified diagram illustrating a first embodiment according to the present invention of a method for irradiating a load over a sequence of frequencies. According to some embodiments of the present invention, there is provided a method in which the transmittal time for each frequency in a sequence of transmitted frequencies is adjusted such that a desired energy is dissipated into the object at that given frequency. The amount of time for transmission of each frequency may be deduced (and accordingly controlled) each time the spectral information and/or dissipation information is updated or at each duty cycle or for several duty cycles or even during a duty cycle, based on spectral information and/or dissipation information. Reference is now made to box 2, in which frequencies to be transmitted to a load are provided. The frequencies are, at times, predetermined although more generally they may be selected dynamically during the irradiation process (e.g., based on spectral information and/or dissipation information). In box 4, the transmission duration per each selected frequency is determined. The transmittal time for each frequency is adjusted such that a desired energy (absolute or relative) is dissipated into the object at any given frequency in a given cycle (or plurality of cycles). In box 6, the load is irradiated such that each frequency from the selected frequencies is transmitted for the duration that was set in box 2.

Figure 1B:
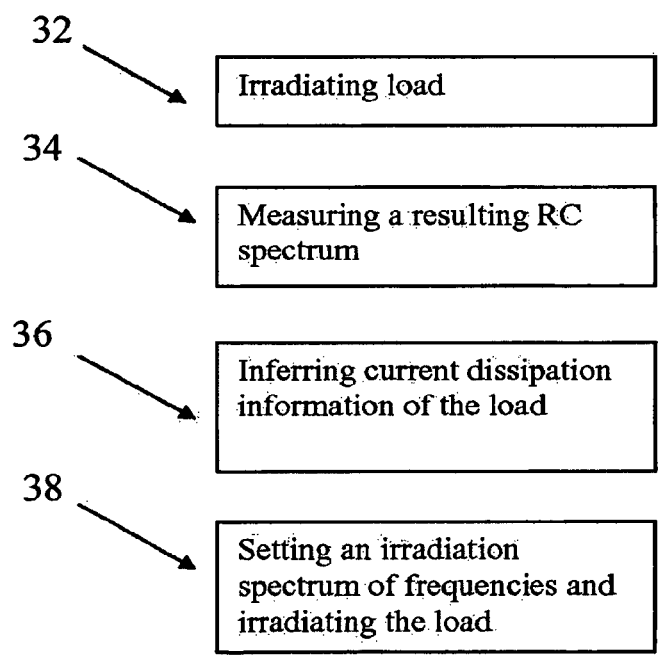
FIG. 1B is a simplified flow chart illustrating a method according to some embodiments of the present invention for providing controlled energy irradiation to a load whose dissipation information varies depending on the energy state of the load.

Reference is now made to FIG. 1B, which is a simplified flow chart illustrating a method for providing controlled energy irradiation to a load according some embodiments of the present invention and illustrating how feedback from the load and/or cavity can be used for setting of the transmission times for the various frequencies. Normally a load has an energy dissipation characteristic which is not static but rather varies depending on a current state of the load.

More generally, differing materials (or materials having varying characteristics) typically have variable absorptive properties (e.g. due to being composes of a plurality of materials or of a material having different phases). Moreover, absorptive properties are often a function of temperature and/or phase of the materials in the object. Thus, as the temperature and/or phase of an object changes, the object's absorptive properties may change, and the rate and magnitude of this change may depend on properties of material(s) in the object. In addition, the shape of an object may contribute to its absorptive properties at a particular frequency. Irregularly shaped objects, for example, may exhibit irregular electromagnetic energy absorption. All these factors can make it difficult to control the absorption of electromagnetic energy in an object.

In box 32, the cavity is irradiated with the irradiation spectrum of frequencies. In box 34, a resulting RC spectrum is measured. The steps shown in boxes 32 and 34 may be performed such that the measurement itself would not transmit a significant amount of energy to the load. This may be done for example at a low power that would have little or no heating effect, but would suffice for obtaining the reflectance spectrum. Alternatively the spectral information (or dissipation information) may be measured by transmitting at high power, but for a very short time (e.g. 1, 10, 100 or even 1000 msec). The reflectance spectrum indicates, inter alia, the dissipation information or characteristics for each transmitted frequency and for the whole transmitted spectrum. In box 36 a current dissipation information of the load is inferred.

In box 38, the irradiation spectrum of frequencies is set to accord with the dissipation information inferred in previous steps. This setting may include setting the selection of which frequencies to transmit and/or setting a transmission power and/or time to accord with the dissipation information, and may include the necessary calculation steps needed to set such parameters based on the dissipation information. When all frequencies are transmitted for the duration that is set for them, one duty cycle is finished and a new cycle may commence. Such a duty cycle may be deemed to include a plurality of transmission cycles.

Thereafter, the irradiating in box 38 may be stopped and the process may be repeated (boxes 32-38), thereby dynamically resetting the transmission times to accord with the changes in the RC spectrum (or dissipation spectrum) during heating. Thus the load may be irradiated such that a wanted dissipation pattern is achieved. Relative amounts of energy transmitted at different frequencies may be adjusted in response to the respective dissipation ratios at each frequency in the band. Alternatively, the relative amounts of energy transmitted may be adjusted in response to a function or derivation of the dissipation ratios at all the frequencies in the band, thereby affecting the energy distribution pattern in the load.

Figure 1C:
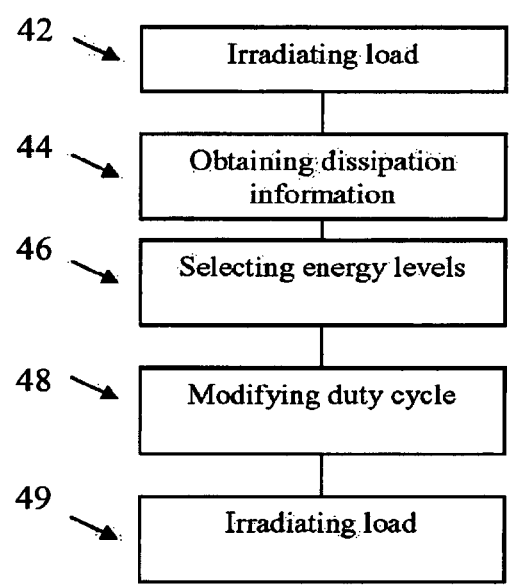
FIG. 1C is a simplified flow chart of a method of controlling the amount of energy that dissipates into a load at each transmitted frequency through modulation of the period in which each frequency is transmitted accordance with some embodiments of the invention.

Reference is now made to FIG. 1C, which is a simplified flow chart of a method of controlling the amount of energy that dissipates into a load at each transmitted frequency through modulation of the period in which each frequency is transmitted. In box 42, the load is irradiated by UHF or Microwave radiation, using a sequence of frequencies in a duty cycle. This may be done at relatively low power and/or at a high power for a very short transmission time such that information is obtained with very little energy transfer (hence little or no effect on the dissipation information). In box 44, dissipation information is obtained from the load. In box 46, energy levels are selected for each frequency based desired energy transmission pattern. This may be based for example on respective dissipation levels and overall desired energy dissipation for the load. In box 48, the duty cycle is set at least by selecting respective durations within the duty cycle during which corresponding frequencies are transmitted. Typically the given power is the maximal possible power at that frequency, and in view of the dissipation ratio for that frequency, the set amount of energy is transmitted. In box 49, the load is irradiated according to the duty cycle. This may be followed again by box 42 of a new round of duty cycle modification. The initial energy dissipation information (or in fact the whole dissipation pattern) may be obtained from pre-defined energy dissipation information, (e.g., expected dissipation information for an egg, or for heating water based on previous operation of the device or a like device with a similar load). The duty cycle is modified by varying at least the respective durations within the duty cycle during which corresponding frequencies are transmitted. The duty cycle may comprise the frequencies that are used for irradiating the load and the power that is transmitted at corresponding frequencies. The energy per frequency may be limited within the cycles. The limiting may be based on a maximum cumulative time power combination for each frequency allowed for performing the cycles or on a maximum energy per frequency allowed.

As has been noted elsewhere herein, not all energy transmitted is actually dissipated (or absorbed) by the load. The proportion of energy transmitted that is absorbed by the load normally varies for different frequencies and for different loads. Excess transmitted energy may be reflected back to the feed or coupled to another feed if such is present.

Figure 2:
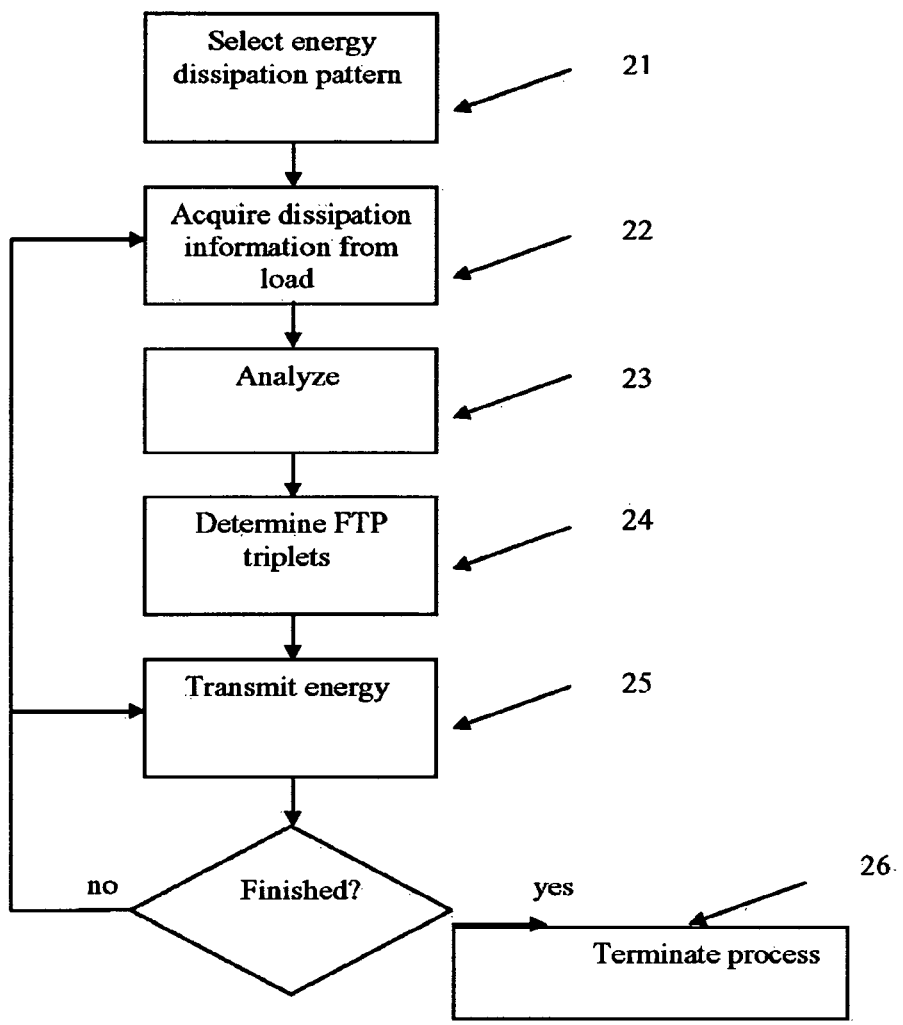
FIG. 2 is an exemplary flow chart of controlling the transfer of energy by irradiation in a plurality of frequencies.

FIG. 2 is an exemplary flow chart depicting control over the amount of energy that is transmitted. In box 21, an energy dissipation pattern is optionally selected. In box 22, dissipation information is acquired from the load (e.g., by transmitting a low energy frequency sweep as described above). In box 23, the dissipation information is analyzed. In box 24, per each frequency that is to be transmitted, frequency/time/power (FTP) triplets are selected to perform the selected profile. A method for selecting the triplets is explained in greater detail hereinafter. One or more of the FTP triplets may be fixed for all or a plurality of frequencies. In box 25 energy is transmitted to the load according to the FTP triplets. The process described in boxes 21-25 may be repeated with or without new information acquisition and analysis steps. Box 26 describes the termination, which may be automatic. Automatic termination may be after a set amount of energy was dissipated or after a given time is expired, or based on sensed input which may be humidity/temperature/volume/phase change and the like. The termination can also be manual.

The amount of power that is desired to be dissipated in the load at a given frequency for a given dissipation ratio for a unit time is defined hereinafter as dpl(f). Power means the energy dissipated per unit time. Supplying different amounts of energy for different frequencies may be carried out for example by using different peak powers, different duty cycles and/or transmitting at different rates. For example, power may be supplied at fixed amplitudes, but at a different rate and/or delays between pulses for different frequencies.

In power adjusted heating, the time allotted for transmission of each frequency is fixed for all transmitted frequencies within a cycle, but the power may vary between frequencies. When it is desired to have a homogeneous dissipation of power at all frequencies (or a particular range of frequencies), dpl(f) is selected to be the same for all transmitted frequencies. In such cases, a different power is transmitted at different frequencies having different dissipation ratios to affect an essentially homogeneous amount of energy dissipated at the respective frequencies.

The maximal amount of power that may be dissipated in a load in a unit of time (using a given power source—e.g. RF power amplifier) is defined as ep(f), which is a function of the dissipation ratio at that frequency (dr(f)) and the maximum power available from the power source at that frequency ($P_{max}$). Since (in power adjusted heating) the time allotted for transmission of each frequency is fixed for all transmitted frequencies, for some frequencies it might not be possible to dissipate a high desired amount of energy within the time slot (i.e. where ep(f)<dpl(f)). Choosing a low dpl(f) may increase the number of frequencies that can have the desired amount of power (dpl) dissipated in them (ep(f)≥dpl (f)), and consequently the desired amount of energy dissipates in more portions of the load. However, this would be at the expense of the speed of energy dissipation. Choosing a higher dpl may increase the speed of heating since more energy is dissipated within a given time slot, but also causes a higher deviation of the actual energy dissipation from the selected energy dissipation pattern because more frequencies have ep(f)<dpl and hence may receive only the maximum available energy, which, for those frequencies in that circumstance, is lower than dpl. It is noted, that by modifying a characteristic of the cavity (e.g., by moving a field adjusting element and/or moving the load), the spectral information and/or dissipation information may be modified such that, for example, a given dpl(f) would be transmittable at a greater number of frequencies, thereby allowing an increase of the heating rate at a given level of uniformity.

In time adjusted heating, the time allotted for transmission of each frequency may be varied between transmitted frequencies within a cycle and optionally the transmission power may also vary between frequencies. When it is desired to have a homogeneous, or essentially homogeneous, dissipation of power at all or some frequencies, dpl(f) is selected to be the same for all transmitted frequencies. By using this method, a different time may be used to transmit at different frequencies at the same and/or different transmission powers, but due to different dissipation ratios, essentially the same amount of power is dissipated in the load.

Since in time adjusted heating, the time allotted for transmission of each frequency may vary, e.g., in order to compensate for differences in ep(f), more frequencies may be useful at a given dpl(f) than in power adjusted heating. In fact, in time adjusted heating, the dissipation patterns and time are virtually unlimited when compared to those achievable under similar conditions with power adjusted heating. Still other limitations may be imposed, as detailed for example below, that might prevent the use of frequencies having too high or too low dissipation ratios and/or ep(f). Therefore, modifying a characteristic of the cavity, for example by moving a field adjusting element and/or moving the load, in a time adjusted protocol may also be used to modify the number (or proportion) of frequencies which may be used to affect a desired dissipation pattern.

According to some embodiments, a desired total amount of energy to be dissipated in the load in any given transmission cycle may be set in advance. A transmission cycle, termed also as duty cycle, is a set of transmissions comprising all frequencies used in a working band and transmitted at one time or in a sequence, according to a desired energy dissipation pattern. In a cycle, a frequency may be transmitted once or more than once, as with the above mentioned group of cycles, to affect the energy dissipation pattern. A cycle, for example, can be implemented as a frequency sweep, where each frequency is transmitted once, and/or as a pulse where a plurality of frequencies are transmitted at the same time or using and/or any other method known in the art. A cycle may be the total transmissions of energy between resetting events of the transmission spectrum parameters. A single heating protocol may be performed as a single transmission cycle (especially when the desired energy dissipation is small) or as a plurality of transmission cycles.

According to some embodiments for time adjusted heating, a bottom transmitted power limit may be selected, for example, to prevent an undue elongation of the cycle by the need to transmit at relatively low ep(f) (e.g., 50% or less, 20% or less, 10% or less, or even 3% or less of the maximum ep(f) value), or when ep(f) is below a pre-set absolute value. This power limitation is termed herein as bpl. tpl(f)) denotes the power that may be transmitted by the device at a given frequency to dissipate dpl. Hence, tpl(f) is a function of dpl, the maximum amount of power that can be transmitted by the device at a given frequency and the dissipation ratio (dr(f)) at that frequency). Where tpl(f) is lower, the time needed in order to have dpl(f) dissipated is longer than if tpl(f) was higher (for the same dpl(f)). Where tpl(f)<bpl the heating protocol may hence be adjusted to limit the amount of time spent at such frequencies. For example—frequencies having a tpl(f) that is below bpl may be ignored, in other words not transmitted at all, or alternatively, they may be transmitted for a limited period of time. Thus, for example, the period of heating for ep(f)=bpl.

According to some embodiments, the amount of maximal transmitted power is limited, for example in order to prevent damage to the device. The limitation is performed by setting a maximum limit on tpl(f). This limitation may have greater importance at low dissipation ratio frequencies where the portion of transmitted power that is not dissipated in the load is large. The effect of this limitation may be reduced by adding protective measures to different parts of the device, such as cooling means to the reflected power load. The controller may be configured to prevent the power that is dissipated in the reflected power load from exceeding a predefined upper limit. Such a configuration may be achieved by calculating the return and coupled energy or by measuring temperature or any other means known in the art.

According to some embodiments, an upper limit may be imposed on the power level that is allowed to be transmitted into the cavity for any reason, including for example prevention of damage to the device and prevention of excessive emission from the device. Such a limit is termed utpl. The transmission (tpl'(f)) according to such limitation is depicted in Table 1.

TABLE 1

$$tpl'(f) = \begin{cases} utpl & tpl(f) > utpl \\ tpl(f) & else \end{cases}$$

According to some embodiments, an upper limit may be imposed on the power level that is allowed to be dissipated into the load for prevention of damage to the load and/or the device and/or prevention of excessive emission from the device or for any other reason. The upper limit in such a case is termed herein as upl. The limitation is defined in Table 2, wherein gl(f) denotes the amount of power to be dissipated into the load at each frequency regardless of upl, and gl'(f) denotes the amount of power to be dissipated into the load at each frequency when taking upl into account.

TABLE 2

$$gl'(f) = \begin{cases} upl & gl(f) > upl \\ gl(f) & else \end{cases}$$

Finally, at times two or more of upl, utpl and bpl may be used.

Exemplary Method for Selecting FTPS:

dr(f), being the dissipation ratio at a given frequency, has potential values between 0 and 1, and may be computed as shown in Equation 1, based on the measured power and using measured S-parameters, as known in the art.

$$dr_j(f) = \frac{P^i_{incident,watt}(f) - \sum_i P^i_{returned,watt}(f)}{P^i_{incident,watt}(f)} = 1 - \frac{\sum_i P^i_{returned,watt}(f)}{P^i_{incident,watt}(f)}$$

The maximum power that can be dissipated in the load at each frequency (depicted as $ep_j(f)$) is calculated as follows, given that $P_{maximum,j,watt}$ is a maximum power available from the amplifier at each frequency.

$$ep_j(f) = dr_j(f) P_{maximum,j,watt}(f)$$

In any given dissipation cycle, gl(f) denotes the power to be dissipated into the load at each frequency. dpl(f) is defined as the amount of power that is desired to be dissipated in the load at a given frequency and the dissipation is therefore as described in table 3.

TABLE 3

$$gl(f) = \begin{cases} dpl(f) & dpl(f) \leq ep(f) \\ ep(f) & else \end{cases}$$

Note: gl(f) (and ep(f) and dpl(f)) is a powers that are to be dissipated into the load; the power to be transmitted by the device at each frequency (tpl(f)) is a function of gl(f) and dr(f) as described in table 4.

TABLE 4

$$tpl(f) = \frac{gl(f)}{dr(f)}$$

In cases where a bpl is applied such that transmitted is prevented for tpl(f) values lower than bpl, the actual transmission (ttl'(f)) is therefore as described in table 5.

TABLE 5

$$tpl'(f) = \begin{cases} 0 & tpl(f) < bpl \\ tpl(f) & else \end{cases}$$

Transmission Time Calculation:

In some exemplary embodiments of the invention, a basic time step is chosen (hereinafter termed bts (e.g., 10 nsec)). The basic time step is normally a feature of the controller that controls the time for transmission of each frequency and defines the maximal resolution in time units between transmitted frequencies. ttd(f) is a numerical value, which defines the time needed to transmit tpl(f), as measured in bts units. ttd(f) may be calculated as follows:

$$ttd(f) = \frac{tpl'(f)}{ep(f)/dr}$$

Accordingly, the minimal transmission time may be calculated as a function of ttd(f) and bts. At times, it may be desired to impose a cycle time that would transmit at least a meaningful amount of energy, or that the cycle time would not be very short for any other reason. Therefore, a time stretch constant (tsc) may be introduced to increase the cycle time above the aforementioned minimum, thereby calculating the actual transmission time for each frequency (att(f)) as follows:

$$att(f) = ttd(f) * bts * tsc$$

tsc may be used to increase/decrease a cycle duration. This may be a fixed value for a device or different fixed values may be set for different operation protocols of the device or based on characteristics of the load, or adjusted from time to time during an operation cycle (e.g. based on limitations for a total amount of energy is transmitted per cycle), etc. In fact, at times, increasing the value of tsc may be used in order to transmit low dpl(D values, which may increase the overall duration of the energy transmission process, but might provide more exactly the desired dissipation pattern.

It should be noted, that a given total amount of transmission time (att(f)) is assigned to each frequency so that this period is not necessarily transmitted continuously. Rather, a transmission cycle may be broken down to a plurality of cycles, wherein some or all of the transmitted frequencies are transmitted for periods smaller than att(f) whilst the total transmission time for each frequency is maintained as att(f).

Demonstration of Time Reduction:

The exemplary description is based on two transmitted frequencies $f_1$ and $f_2$ and a maximum transmittal power of a device $P_{maximum}=P_1>P_2$. According to a selected power transfer protocol based on adjusting the power transmitted, $P_1$ is transmitted at $f_1$ and $P_2$ at $f_2$, each for a fixed period of time t. In such case, the total time used to transmit $E_1$ and $E_2$ is 2t.

$$E_1 = P_1 t$$

$$E_2 = P_2 t$$

$$t_{total} = 2t$$

According to a selected power transfer protocol based on adjusting the time during which energy is transmitted, $P_{maximum}$ is transmitted at both $f_1$ and $f_2$. In such case, the total time used to transmit $E_1$ and $E_2$ is calculated as follows:

$$E_1 = P_{maximum} t_1 = P_1 t$$

$$E_2 = P_{maximum} t_2 = P_2 t$$

Since $P_{maximum}=P_1$, $t_1$ must be equal to t. But since $P_{maximum}>P_2$, $t_2$ must be smaller than t:

$$t_2 = t - \delta$$

$$t_{total} = t_1 + t_2 = t + (t-\delta) = 2t - \delta < 2t$$

Figure 3:
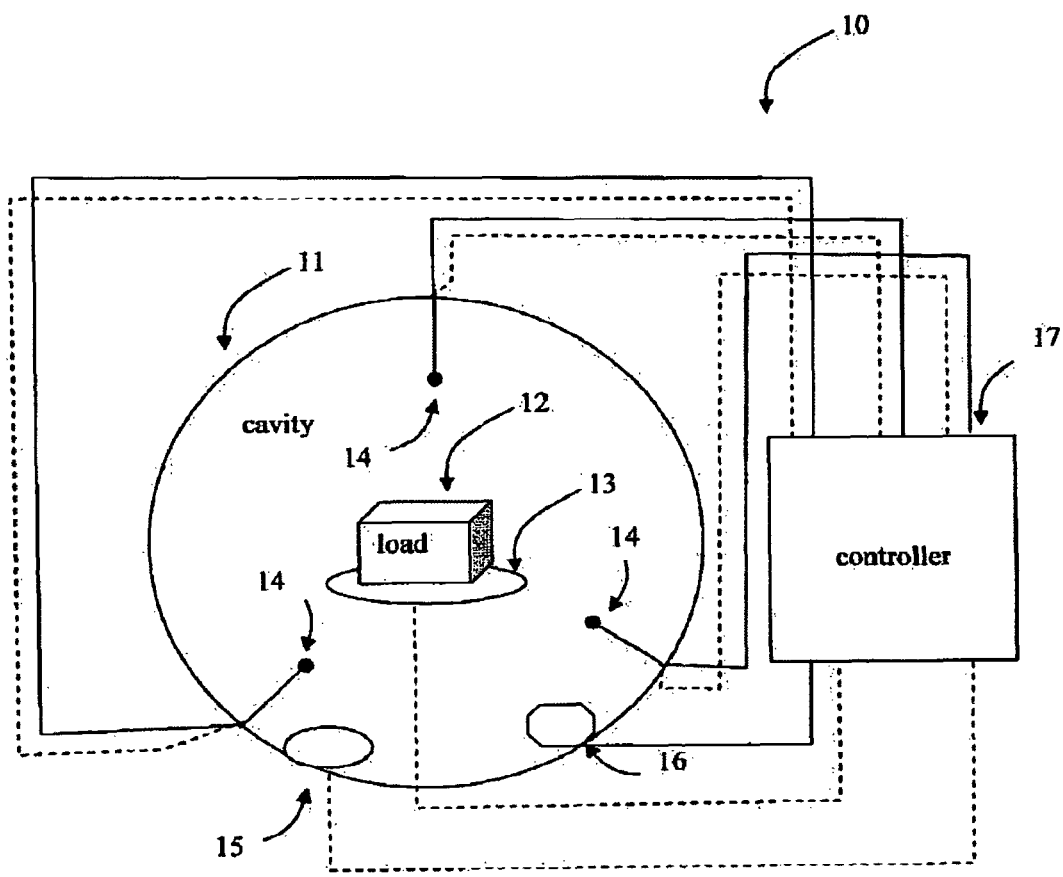
FIG. 3 schematically depicts a device in accordance with an exemplary embodiment of the present invention.

FIG. 3 schematically depicts a device 10 according to an embodiment of the present invention. Device 10, as shown, comprises a cavity 11. Cavity 11 as shown is a cylindrical cavity made of a conductor, for example a metal such as aluminum. However, it should be understood that the general methodology of the invention is not limited to any particular resonator cavity shape. Cavity 11, or any other cavity made of a conductor, operates as a resonator for electromagnetic waves having frequencies that are above a cutoff frequency (e.g. 500 MHz) which may depend, among other things, on the geometry of the cavity. Methods of determining a cutoff frequency based on geometry are well known in the art, and may be used.

A load 12 (a/k/a an object) is placed in the cavity, which may be a Faraday cage, optionally on a supporting member 13 (e.g., a microwave oven plate). In an exemplary embodiment of the invention, cavity 11 may include one or more feeds 14 which may be used for transmitting energy into the cavity for resonating in the presence of the load in a sequence of frequencies. The energy is transmitted using any method and means known in that art, including, for example, use of a solid state amplifier. One or more, and at times all, of the feeds 14 can also be used one or more times during operation for obtaining the spectral information of the cavity, and/or dissipation information of the load, within a given band of RF frequencies to determine the spectral information of the cavity, e.g., dissipation information of the load, as a function of frequency in the working band. This information is collected and processed by controller 17, as will be detailed below.

Controller 17 may include at least one processor configured to execute instructions associated with the presently disclosed embodiments. As used herein, the term "processor" may include an electric circuit that performs a logic operation on input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations.

Cavity 11 may include, or, in some cases define, an energy application zone. Such an energy application zone may be any void, location, region, or area where electromagnetic energy may be applied. It may include a hollow, or may be filled or partially filled with liquids, solids, gases, plasma, or combinations thereof. By way of example only, an energy application zone may include an interior of an enclosure, interior of a partial enclosure, open space, solid, or partial solid, that allows existence, propagation, and/or resonance of electromagnetic waves. For purposes of this disclosure, all such energy application zones may be referred to as cavities. An object is considered "in" the energy application zone if at least a portion of the object is located in the zone or if some portion of the object receives delivered electromagnetic radiation.

As used herein, the terms radiating element and antenna may broadly refer to any structure from which electromagnetic energy may radiate and/or be received, regardless of whether the structure was originally designed for the purposes of radiating or receiving energy, and regardless of whether the structure serves any additional function. For example, a radiating element or an antenna may include an aperture/slot antenna, or an antenna which includes a plurality of terminals transmitting in unison, either at the same time or at a controlled dynamic phase difference (e.g. a phased array antenna). Consistent with some exemplary embodiments, feeds 14 may include an electromagnetic energy transmitter (referred to herein as "a transmitting antenna") that feeds energy into electromagnetic energy application zone, an electromagnetic energy receiver (referred herein as "a receiving antenna") that receives energy from the zone, or a combination of both a transmitter and a receiver.

Energy supplied to a transmitting antenna may result in energy emitted by the transmitting antenna (referred to herein as "incident energy"). The incident energy may be delivered to the energy application zone, and may be in an amount equal to the one that is supplied to the antennas by a source. Of the incident energy, a portion may be dissipated by the object (referred to herein as "dissipated energy"). Another portion may be reflected at the transmitting antenna (referred to herein as "reflected energy"). Reflected energy may include, for example, energy reflected back to the transmitting antenna due to mismatch caused by the object and/or the energy application zone. Reflected energy may also include energy retained by the port of the transmitting antenna (i.e., energy that is emitted by the antenna but does not flow into the zone). The rest of the incident energy, other than the reflected energy and dissipated energy, may be transmitted to one or more receiving antennas other than the transmitting antenna (referred to herein as "transmitted energy."). Therefore, the incident energy ("I") supplied to the transmitting antenna may include all of the dissipated energy ("D"), reflected energy ("R"), and transmitted energy ("T"), the relationship of which may be represented mathematically as $I=D+R+\Sigma T_i$.

In accordance with certain aspects of the invention, the one or more transmitting antennas may deliver electromagnetic energy into the energy application zone. Energy delivered by a transmitting antenna into the zone (referred to herein as "delivered energy" or "d") may be the incident energy emitted by the antenna minus the reflected energy at the same antenna. That is, the delivered energy may be the net energy that flows from the transmitting antenna to the zone, i.e., $d=I-D$. Alternatively, the delivered energy may also be represented as the sum of dissipated energy and transmitted energy, i.e., $d=R+T$.

In an exemplary embodiment of the invention, cavity 11 may also include one or more sensors 15. These sensors may provide additional information to controller 17, including, for example, temperature, detected by one or more IR sensors, optic fibers or electrical sensors, humidity, weight, etc. Another option is use of one or more internal sensors embedded in or attached to the load (e.g. an optic fiber or a TTT as disclosed in WO07/096,878).

Alternatively or additionally, cavity 11 may include one or more field adjusting elements (FAE) 16. An FAE is any element within the cavity that may affect its spectral information (or dissipation information or RC spectrum) or the information derivable therefrom. Accordingly, an FAE 16 may be for example, any load within cavity 11, including one or more metal components within the cavity, feed 14, supporting member 13 and even load 12. The position, orientation, shape and/or temperature of FAE 16 are optionally controlled by controller 17. In some embodiments of the invention, controller 17 may be configured to perform several consecutive sweeps. Each sweep is performed with a different FAE property (e.g., changing the position or orientation of one or more FAE) such that a different spectral information (e.g. dissipation information or RC spectrum) may be deduced. Controller 17 may then select the FAE property based on the obtained spectral information. Such sweeps may be performed before transmitting RF energy into the cavity, and the sweep may be performed several times during the operation of device 10 in order to adjust the transmitted powers and frequencies (and at times also the FAE property) to changes that occur in the cavity during operation.

At times, the FAEs are controlled and/or the load is rotated or moved, so that more useful spectral information (e.g., dissipation information or RC spectrum) may be acquired for selective irradiation and/or for setting of radiation parameters such as dpl (and any of other radiation parameters defined herein), for example as described below. Optionally or alternatively, the load and/or FAEs are periodically manipulated and/or based on a quality or other property of the acquired spectral information. Optionally, the settings are selected which allow a highest dpl(f) to be selected.

An exemplary transfer of information to the controller is depicted by dotted lines. Plain lines depict examples of the control exerted by controller 17 (e.g., the power and frequencies to be transmitted by an feed 14 and/or dictating the property of FAE 16). The information/control may be transmitted by any means known in the art, including wired and wireless communication.

Controller 17 may also be used for regulating the energy per frequency by varying respective durations during which corresponding frequencies are transmitted.

Figure 4A:
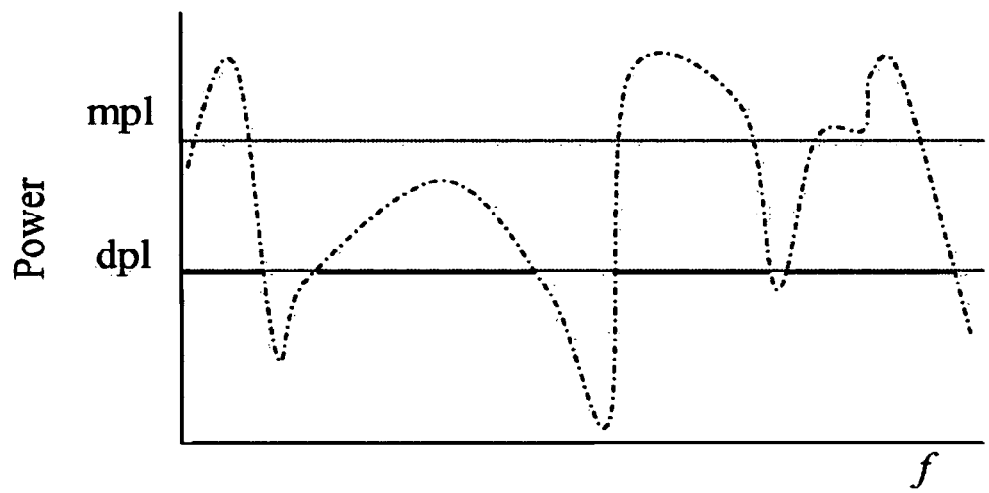
FIGS. 4A and 4B depict schematic graphs of power versus frequency for an exemplary decision functions.
Figure 4B:
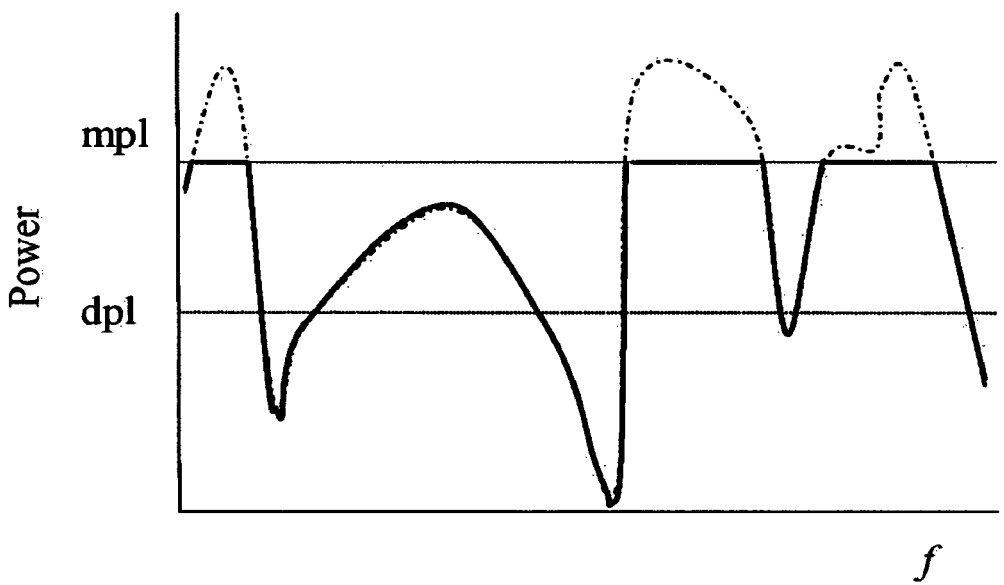

FIGS. 4a and 4b depict exemplary graphs representing two examples of adjusting parameters before performing a duty cycle, in order to dissipate the same amount of energy at a plurality of frequencies. FIG. 4A represents a power-adjusted method while FIG. 4B represents a time-adjusted method. In this example, the t-adjusted method is one wherein the amount of time allotted per each frequency before is adjusted performing a duty cycle while maintaining a fixed amount of power per each transmitted frequency, and the time adjusted method is one wherein the amount of power per each frequency is adjusted before performing duty cycle while maintaining the time allotted per each frequency fixed.

The dashed lines in FIG. 4A and in FIG. 4B respectively represent the maximum power that can be dissipated in the load at each frequency (ep(f)). As shown in the figures, the maximum dissipated power (ep(f)) is the same in both figures. In both figures, a limiting factor termed mpl is introduced, denoting a maximal power level above which dissipation is prevented. In FIG. 4A, the time for transmission of each frequency is fixed, and the power chosen to be dissipated at each frequency is the same, and is selected to be dpl (e.g. based on a tradeoff between heating at high power and using a large number of frequencies having an ep(f) that is at least equal to dpl). As can be seen, some frequencies having ep(f)<dpl are not transmitted, and all but a few frequencies are transmitted below their ep(f). In FIG. 4B which represents a time-adjusted method, most of the frequencies are transmitted at respective ep(f), except those having ep(f)>mpl. The line denoting dpl in FIG. 4B shows the same dpl line appearing in FIG. 4A and is provided merely for comparison between the two graphs.

Figure 5:
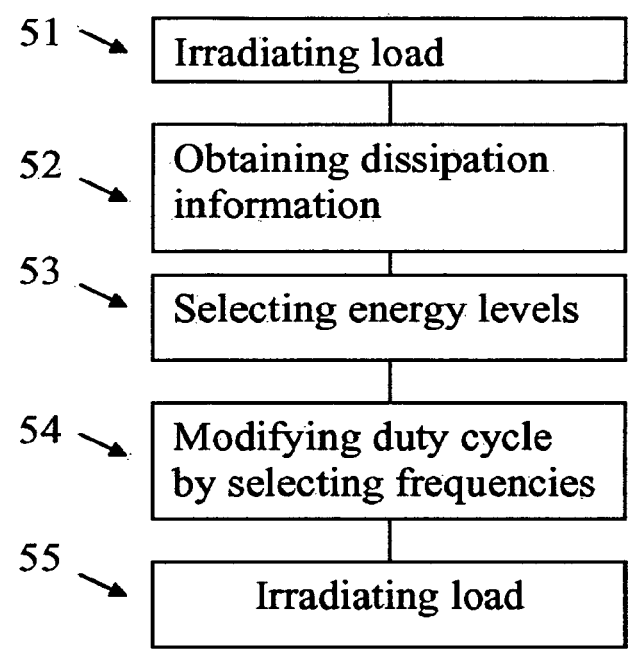
FIG. 5 is an exemplary scenario of controlling a duty cycle for irradiating a load, according to embodiments of the present invention.

FIG. 5 is an exemplary scenario of selecting the frequencies that appear in each cycle, according to embodiments of the present invention. In this example the time allotted per each frequency is fixed in each duty cycle and the adjustment is achieved by determining which frequency appears in which duty cycle. Such an adjustment takes into consideration the desired percentage of energy transmitted at each frequency. A certain frequency may appear in all duty cycles to provide a hundred percent of its maximum energy while another frequency may appear in one out of a plurality of duty cycles (e.g., 1 in 3) to achieve a portion (one third in the aforementioned example) of its maximum energy output. Increased resolution may be achieved if selecting not to transmit a frequency or transmitting but below its full power for some of the cycles. In box 42, the load is irradiated by UHF or microwave radiation, using a sequence of frequencies in a duty cycle. In box 44, dissipation information is obtained from the load. In box 46, energy levels are selected for each frequency that participates in the current duty cycle based on respective dissipation levels and desired energy dissipation for the load. In box 48, the duty cycle is modified by varying the frequencies that take place in the duty cycle. In box 49, the load is irradiated according to the modified duty cycle, which may then be followed by box 42 of a new round of duty cycle modification. The desired energy dissipation is obtained from pre-selected energy dissipation information.

In another example, power is provided as multi-frequency pulses, with each pulse including power in a plurality of frequencies; the frequencies in each pulse and/or amplitude of the power for a frequency in a pulse may be selected to apply a desired average power.

Returning to several of the concepts introduced above, it should be noted that, in certain embodiments, at least one processor may be configured to determine a value indicative of energy absorbable by the object at each of a plurality of frequencies or MSEs (The MSE concept will be described later in greater detail). This may occur using one or more lookup tables, by pre-programming the processor or memory associated with the processor, and/or by testing an object in an energy application zone to determine its absorbable energy characteristics. One exemplary way to conduct such a test is through a sweep or scan.

Figure 6:
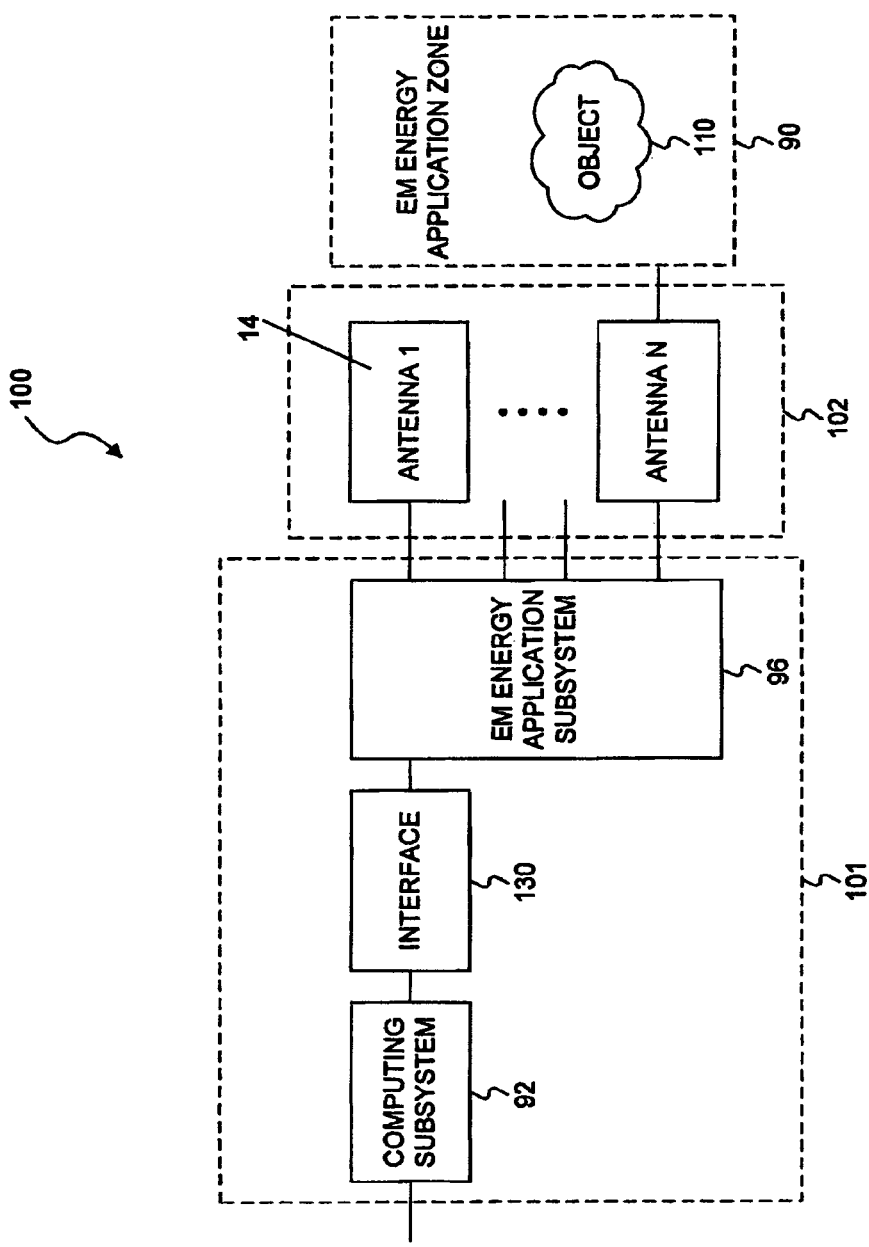
FIG. 6 is a diagram of an apparatus for applying electromagnetic energy to an object, in accordance with an exemplary embodiment of the present invention.

As used herein, the word "sweep" may include, for example, the transmission over time of more than one frequency or MSE. For example, a sweep may include the sequential transmission of multiple frequencies or MSEs in a contiguous frequency or MSE band; the sequential transmission of multiple frequencies or MSEs in more than one non-contiguous frequency or MSE band; the sequential transmission of individual non-contiguous frequencies or MSEs; and/or the transmission of synthesized pulses having a desired frequency (or MSE)/power spectral content (i.e. a synthesized pulse in time). Thus, during a frequency or MSE sweeping process, the at least one processor may regulate the energy supplied to the at least one antenna to sequentially deliver electromagnetic energy at various frequencies or MSEs to an energy application zone 90, and to receive feedback which serves as an indicator of the energy absorbable by object or load 110, as shown in FIG. 6. While the invention is not limited to any particular measure of feedback indicative of energy absorption in the object, various exemplary indicative values are discussed below.

During the sweeping process, electromagnetic energy application subsystem 96 may be regulated to receive electromagnetic energy reflected and/or coupled at antenna(s) 102 (including feeds or antennas 14, for example), and to communicate the measured energy information back to subsystem 92 via interface 130, as illustrated in FIG. 6. Subsystem 92, which may include one or more processors, may then determine a value indicative of energy absorbable by object 110 at each of a plurality of frequencies or MSEs based on the received information. Consistent with the presently disclosed embodiments, a value indicative of the absorbable energy may be a dissipation ratio (referred to herein as "DR") associated with each of a plurality of frequencies or MSEs. As referred herein, a "dissipation ratio," also known as "absorption efficiency" or "power efficiency", may be defined as a ratio between electromagnetic energy absorbed by object 110 and electromagnetic energy supplied into electromagnetic energy application zone 90.

Energy that may be dissipated or absorbed by an object is referred to herein as "absorbable energy." Absorbable energy may be an indicator of the object's capacity to absorb energy or the ability of the apparatus to cause energy to dissipate in a given object. In some of the presently disclosed embodiments, absorbable energy may be calculated as a product of the maximum incident energy supplied to the at least one antenna and the dissipation ratio. Reflected energy (i.e., the energy not absorbed or transmitted) may, for example, be a value indicative of energy absorbed by the object or other load. By way of another example, a processor might calculate or estimate absorbable energy based on the portion of the incident energy that is reflected and the portion that is transmitted. That estimate or calculation may serve as a value indicative of absorbed energy.

During a frequency or MSE sweep, for example, the at least one processor may be configured to control a source of electromagnetic energy such that energy is sequentially supplied to an object at a series of frequencies or MSEs. The at least one processor may then receive a signal indicative of energy reflected at each frequency or MSE, and optionally also a signal indicative of the energy transmitted to other antennas. Using a known amount of incident energy supplied to the antenna and a known amount of energy reflected and/or transmitted (i.e., thereby indicating an amount absorbed at each frequency or MSE) an absorbable energy indicator may be calculated or estimated. Or, the processor may simply rely on an indicator of reflection as a value indicative of absorbable energy.

Absorbable energy may also include energy that may be dissipated by the structures of the energy application zone in which the object is located. Because absorption in metallic or conducting material (e.g., the cavity walls or elements within the cavity) is characterized by a large quality factor (also known as a "Q factor"), such frequencies or MSEs may be identified as being coupled to conducting material, and at times, a choice may be made not to transmit energy in such sub bands. In that case, the amount of electromagnetic energy absorbed in the cavity walls may be substantially small, and thus, the amount of electromagnetic energy absorbed in the object may be substantially equal to the amount of absorbable energy.

In the presently disclosed embodiments, a dissipation ratio may be calculated using the formula:

$$DR=(P_{in}-P_{rf}-P_{cp})/P_{in}$$

where $P_{in}$ represents the electromagnetic energy supplied into zone 90 by antennas 102, $P_{rf}$ represents the electromagnetic energy reflected/returned at those antennas that function as transmitters, and $P_{cp}$ represents the electromagnetic energy coupled at those antennas that function as receivers. DR may be a value between 0 and 1, and, in the presently disclosed embodiments, may be represented by a percentage number.

For example, in a three antenna system including antennas 1, 2, and 3, subsystem 92 may be configured to determine input reflection coefficients S11, S22, and S33 and the transfer coefficients S12=S21, S13=S31, S23=S32 based on the measured power information during the sweep. Accordingly, the dissipation ratio DR corresponding to antenna 1 may be determined based on these coefficients, according to the formula:

$$DR=1-(|S_{11}|^2+|S_{12}|^2+|S_{13}|^2).$$

Figure 7:
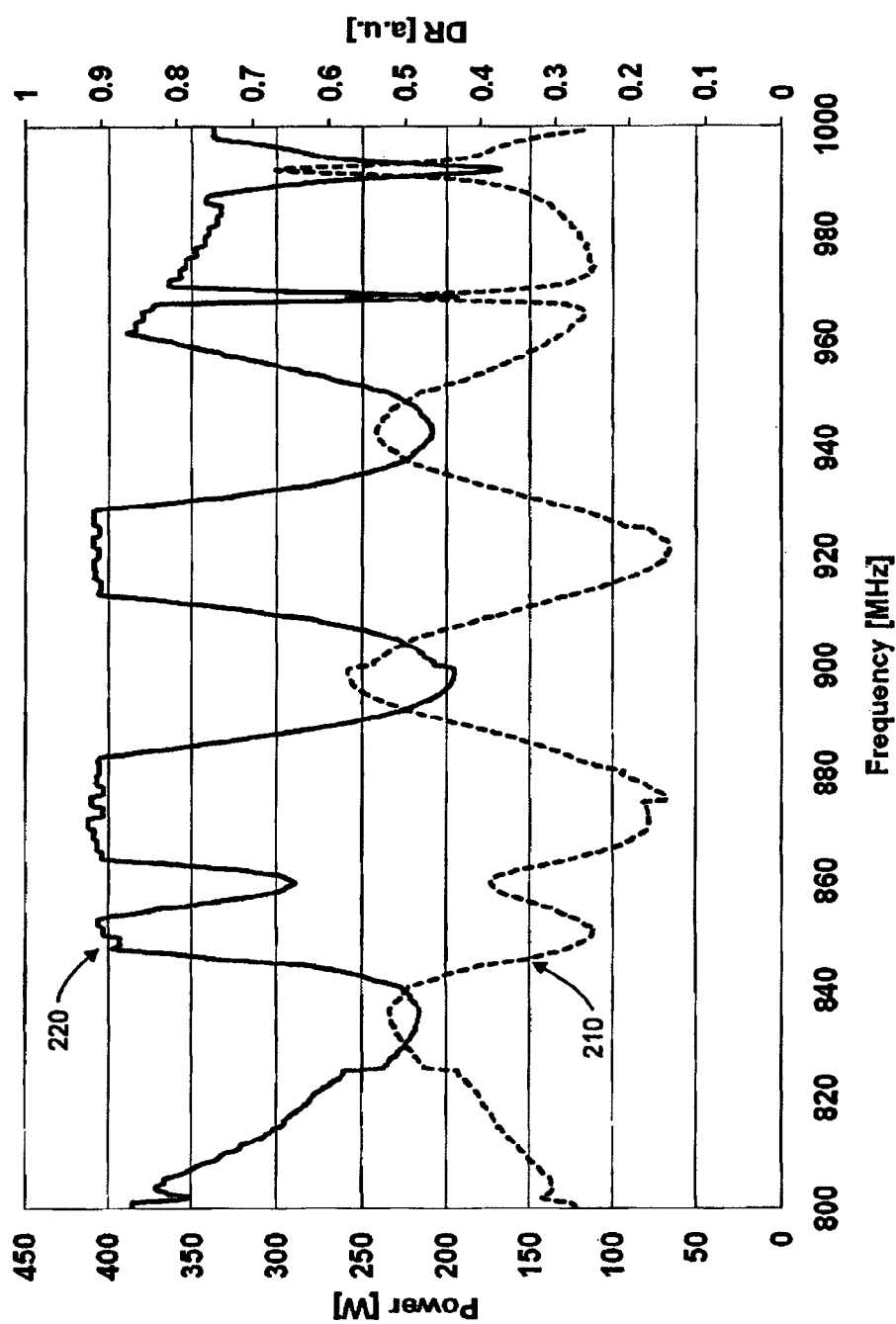
FIG. 7 illustrates a dissipation ratio spectrum (dashed line) and an input energy spectrum (solid line), in accordance with an embodiment of the invention.
Figure 8:
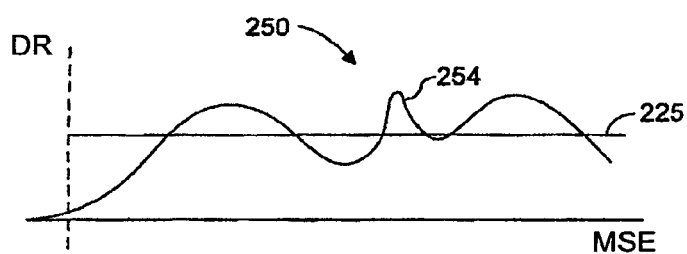
FIG. 8 illustrates a dissipation ratio spectrum, in accordance with an embodiment of the invention.

For a particular object 110, the dissipation ratio may change as a function of the frequency or MSE of the supplied electromagnetic energy. Accordingly, a dissipation ratio spectrum may be generated by plotting the dissipation ratio associated with each frequency or MSE against the respective frequencies or MSEs. Exemplary dissipation ratio (efficiency) spectrums 210 and 250 are illustrated in FIG. 7 and FIG. 8, respectively. FIG. 7 depicts frequencies and FIG. 8 depicts MSEs corresponding to both high and low dissipation ratios. Both illustrate dissipation ratio peaks that are broader than others.

FIG. 8 illustrates a dissipation ratio spectrum 250 over a range of modulation space elements (MSEs). The spectrum 250 plots dissipation ratios (DR) for a particular range of MSEs. Spectrum 250 may include certain areas, such as local peak 254, which are higher than the surrounding areas. Local peak 254 may indicate that a higher percentage of power is dissipated at the corresponding MSE or range of MSEs. Curve 225 may represent a desired level of energy dissipation over a plurality of MSEs. Based on the information included in dissipation ratio spectrum 250, the power at which energy is applied and/or the time duration for which energy is applied at various MSEs may be determined to substantially achieve the desired energy dissipation level 225.

Returning to FIG. 7, curve 210 represents a spectrum of dissipation ratio values over a range of frequencies. Using this information, a desired power level can be provided at each of a plurality of frequencies within this range to achieve a desired energy application profile. Curve 220 represents the power level applied over the frequency band. It can be seen that the power level is substantially inversely proportional to the dissipation ratio curve 210. In the example shown in FIG. 7, 400 W represents the maximum power available to transmit.

According to another exemplary embodiment, the at least one processor may be configured to regulate subsystem 96 (FIG. 6) for measuring a first amount of incident energy at a transmitting antenna at a first frequency or MSE; measure a second amount of energy reflected at the transmitting antenna as a result of the first amount of incident energy; measure a third amount of energy transmitted to a receiving antenna as a result of the first amount of incident energy; and determine the dissipation ratio based on the first amount, the second amount, and the third amount. By way of example, the at least one processor may be configured to measure a first amount of incident energy at a first antenna 102 which performs as a transmitter at a first frequency or MSE, measure a second amount of energy reflected at first antenna 102 as a result of the first amount of incident energy, measure a third amount of energy transmitted to at least one second antenna 102 which performs as a receiver as a result of the first amount of incident energy, and determine the dissipation ratio based on the first amount, the second amount, and the third amount.

The value indicative of the absorbable energy may further involve the maximum incident energy associated with a power amplifier associated with subsystem 96 at the given frequency. As referred herein, a "maximum incident energy" may be defined as the maximal power that may be provided to the antenna at a given frequency or MSE throughout a given period of time. Thus, one alternative value indicative of absorbable energy may be the product of the maximum incident energy and the dissipation ratio. These are just two examples of values that may be indicative of absorbable energy which could be used alone or together as part of control schemes implemented using the processor. Alternative indicia of absorbable energy may be used, depending on the structure employed and the application.

In certain embodiments, the processor may also be configured to cause energy to be supplied to the at least one radiating element in at least a subset of the plurality of frequencies or MSEs, wherein energy transmitted to the zone at each of the subset of frequencies or MSEs may be a function of the absorbable energy value at each frequency or MSE. For example, the energy supplied to the at least one antenna 102 at each of the subset of frequencies or MSEs may be determined as a function of the absorbable energy value at each frequency or MSE (e.g., as a function of a dissipation ratio, maximum incident energy, a combination of the dissipation ratio and the maximum incident energy, or some other indicator). In some of the presently disclosed embodiments, this may occur as the result of absorbable energy feedback obtained during a frequency or MSE sweep. That is, using this absorbable energy information, the at least one processor may adjust energy supplied at each frequency or MSE such that the energy at a particular frequency or MSE may in some way be a function of an indicator of absorbable energy at that frequency or MSE.

The functional correlation may vary depending upon application. For some applications where absorbable energy is relatively high, there may be a desire to have the at least one processor implement a function that causes a relatively low supply of energy at each of the emitted frequencies or MSEs. This may be desirable, for example when a more uniform energy distribution profile is desired across object 110.

For other applications, there may be a desire to have the processor implement a function that causes a relatively high supply of energy. This may be desirable to target specific areas of an object with higher absorbable energy profiles. For yet other applications, it may be desirable to customize the amount of energy supplied to a known or suspected energy absorption profile of the object 110. In still other applications, a dynamic algorithm or a look up table can be applied to vary the energy applied as a function of at least absorbable energy and perhaps one or more other variables or characteristics. These are but a few examples of how energy transmitted into the zone at each of the subset of frequencies or MSEs may be a function of the absorbable energy value at each frequency or MSE. The invention is not limited to any particular scheme, but rather may encompass any technique for controlling the energy supplied by taking into account an indicator of absorbable energy.

In certain embodiments, the energy supplied to the at least one radiating element at each of the subset of frequencies or MSEs may be a function of the absorbable energy values at the plurality of frequencies or MSEs other than the frequency or MSE at which energy is supplied. For example, in some of the presently disclosed embodiments, the dissipation ratios at a range of "neighborhood" frequencies or MSEs around the frequency or MSE at issue may be used for determining the amount of energy to be supplied. In some of the presently disclosed embodiments, the entire working band excluding certain frequencies or MSEs that are associated with extremely low dissipation ratios (which may be associated with metallic materials, for example) may be used for the determination.

In certain embodiments, the processor may be configured to cause energy to be supplied to the at least one radiating element in at least a subset of the plurality of frequencies or MSEs, wherein energy transmitted to the zone at each of the subset of frequencies or MSEs is inversely related to the absorbable energy value at each frequency or MSE. Such an inverse relationship may involve a general trend—when an indicator of absorbable energy in a particular frequency or MSE subset (i.e., one or more frequencies or MSEs) tends to be relatively high, the actual incident energy at that frequency or MSE subset may be relatively low. And when an indicator of absorbable energy in a particular frequency or MSE subset tends to be relatively low, the incident energy may be relatively high.

The inverse relationship may be even more closely correlated. For example, in some of the presently disclosed embodiments, the transmitted energy may be set such that its product with the absorbable energy value (i.e., the absorbable energy by object 110) is substantially constant across the frequencies or MSEs applied. In either case, a plot of transmitted energy may generally appear as a reverse image of a value indicative of absorption (e.g., dissipation ratio or a product of the dissipation ratio and the maximal incident power available at each transmitted frequency). For example, FIG. 7 provides a plotted example of a dissipation ratio spectrum 210 (dashed line) and a corresponding incident power spectrum 220 (solid line) taken during operation of a device constructed and operated in accordance with some of the presently disclosed embodiments. The plots shown in FIG. 7 were taken with an oven having a maximum incident power of about 400 Watts, wherein a 100 gr chunk of minced beef was placed. A range of frequencies between 800 MHz and 1 GHz was swept, and energy was supplied based on the sweep, such that essentially uniform dissipation of energy will be affected in the chunk of beef.

In certain embodiments, the at least one processor may be configured to adjust energy supplied such that when the energy supplied is plotted against an absorbable energy value over a range of frequencies or MSEs, the two plots tend to mirror each other. In some of the presently disclosed embodiments, the two plots may be mirror images of each other. In some of the presently disclosed embodiments, the plots may not exactly mirror each other, but rather, have generally opposite slope directions, i.e., when the value corresponding to a particular frequency or MSE in one plot is relatively high, the value corresponding to the particular frequency or MSE in the other plot may be relatively low. For example, as shown in FIG. 7, the relationship between the plot of transmitted energy (e.g., incident power spectrum 220) and the plot of the absorbable energy values (e.g., dissipation ratio spectrum 210) may be compared such that when the transmitted energy curve is increasing, over at least a section of the curve, the absorbable energy curve will be decreasing over the same section. Additionally, when the absorbable energy curve is increasing, over at least a section of the curve, the transmitted energy curve will be decreasing over the same section. For example, in FIG. 7, incident power spectrum 220 increases over the frequency range of 900 Hz-920 Hz, while dissipation ratio spectrum 210 decreases over that frequency range. At times, the curve of transmitted energy might reach a maximum value, above which it may not be increased, in which case a plateau (or almost plateau) may be observed in the transmission curve, irrespective of the absorbable energy curve in that section. For example, in FIG. 7, when the incident power reaches the maximum value of 400 W, the incident power stays substantially constant regardless of the variations in the dissipation ratio.

Some exemplary schemes can lead to more spatially uniform energy absorption in the object 110. As used herein, "spatial uniformity" refers to a condition where the energy absorption (i.e., dissipated energy) across the object or a portion (e.g., a selected portion) of the object that is targeted for energy application is substantially constant. The energy absorption is considered "substantially constant" if the variation of the dissipated energy at different locations of the object is lower than a threshold value. For instance, a deviation may be calculated based on the distribution of the dissipated energy, and the absorbable energy is considered "substantially constant" if the deviation is less than 50%. Because in many cases spatially uniform energy absorption may result in spatially uniform temperature increase, consistent with some of the presently disclosed embodiments, "spatial uniformity" may also refer to a condition where the temperature increase across the object or a portion of the object that is targeted for energy application is substantially constant. The temperature increase may be measured by a sensing device, such as a temperature sensor in zone 90. In order to achieve approximate substantially constant energy absorption in an object or a portion of an object, controller 101 may be configured to hold substantially constant the amount of time at which energy is supplied to antennas 102 at each frequency or MSE, while varying the amount of power supplied at each frequency or MSE as a function of the absorbable energy value.

In certain situations, when the absorbable energy value is below a predetermined threshold for a particular frequency, frequencies, MSE or MSEs, it may not be possible to achieve uniformity of absorption at each frequency or MSE. In such instances, consistent with some of the presently disclosed embodiments, controller 101 may be configured to cause the energy to be supplied to the antenna for that particular frequency, frequencies MSE or MSEs a power level substantially equal to a maximum power level of the device. Alternatively, consistent with some other embodiments, controller 101 may be configured to cause the amplifier to supply no energy at all at a particular frequency, frequencies, MSE or MSEs. At times, a decision may be made to supply energy at a power level substantially equal to a maximum power level of the amplifier only if the amplifier may supply to the object at least a threshold percentage of energy as compared with the uniform transmitted energy level (e.g. 50% or more or even 80% or more). At times, a decision may be made to supply energy at a power level substantially equal to a maximum power level of the amplifier only if the reflected energy is below a predetermined threshold, in order, for example, to protect the apparatus from absorbing excessive power. For example, the decision may be made based on the temperature of a dummy load into which reflected energy is introduced, or a temperature difference between the dummy load and the environment. The at least one processor may accordingly be configured to control the reflected energy or the absorbed energy by a dummy load. Similarly, if the absorbable energy value exceeds a predetermined threshold, the controller 101 may be configured to cause the antenna to supply energy at a power level less than a maximum power level of the antenna.

In an alternative scheme, uniform absorption may be achieved by varying the duration of energy delivery while maintaining the power applied at a substantially constant level. In other words, for frequencies exhibiting lower absorbable energy values, the duration of energy application may be longer than for frequencies or MSEs exhibiting higher absorption values. In this manner, an amount of power supplied at multiple frequencies or MSEs may be substantially constant, while an amount of time at which energy is supplied varies, depending on an absorbable energy value at the particular frequency or MSE.

In certain embodiments, the at least one antenna may include a plurality of antennas, and the at least one processor may be configured to cause energy to be supplied to the plurality of antennas using waves having distinct phases. For example, antenna 102 may be a phased array antenna including a plurality of antennas forming an array. Energy may be supplied to each antenna with electromagnetic waves at a different phase. The phases may be regulated to match the geometric structure of the phased array. In some of the presently disclosed embodiments, the at least one processor may be configured to control the phase of each antenna dynamically and independently. When a phased array antenna is used, the energy supplied to the antenna may be a sum of the energy supplied to each of the antennas in the array.

Because absorbable energy can change based on a host of factors including object temperature, depending on application, it may be beneficial to regularly update absorbable energy values and thereafter adjust energy application based on the updated absorption values. These updates can occur multiple times a second, or can occur every few seconds or longer, depending on application. As a general principle, more frequent updates may increase the uniformity of energy absorption.

In accordance with the some of the presently disclosed embodiments, a controller may be configured to adjust energy supplied from the antenna as a function of the frequency at which the energy is supplied. For example, regardless of whether a sweep or some other active indicator of energy absorption is employed, certain frequencies or MSEs may be targeted or avoided for energy application. That is, there may be frequencies or MSEs that the controller 101 avoids altogether, such as where the absorption level falls below a predetermined threshold. For example, metals tend to be poor absorbers of electromagnetic energy, and therefore certain frequencies or MSEs associated with metals will exhibit low absorption indicator values. In such instances the metals may fit a known profile, and associated frequencies may be avoided. Or, an absorption indicator value may be dynamically determined, and when it is below a predetermined threshold, controller 101 may prevent an antenna 102 from thereafter supplying electromagnetic energy at such frequencies. Alternatively, if it is desirable to apply energy to only portions of an object, energy can be targeted to those portions if associated frequency or MSE thresholds are either known or dynamically determined. In accordance with another aspect of the invention, the at least one processor may be configured to determine a desired energy absorption level at each of a plurality of frequencies or MSEs and adjust energy supplied from the antenna at each frequency or MSE in order to target the desired energy absorption level at each frequency or MSE. For example as discussed earlier, the controller 101 may be configured to target a desired energy absorption level at each frequency or MSE in attempt to achieve or approximate substantially uniform energy absorption across a range of frequencies or MSEs. Alternatively, the controller 101 may be configured to target an energy absorption profile across the object 110, which is calculated to avoid uniform energy absorption, or to achieve substantially uniform absorption in only a portion of the object 110.

Modulation Space (MS) and Modulation Space Elements (MSES)

As described above, some of the presently disclosed embodiments may be configured to achieve a desired heating pattern in a load. Such a load may include multiple objects, one or more different phases of a material, and/or different material compositions. For example, by scanning a load over a range of frequencies or MSEs, a dissipation ratio can be determined for each frequency. Using the dissipation ratio information, the controller 101 may be configured to target a desired energy absorption level at each frequency (or MSE). In one exemplary embodiment, the level of power supplied at each MSE can be controlled such that lower power levels are supplied at MSEs that exhibit high dissipation ratios and higher power levels can be supplied at MSEs that exhibit low dissipation ratios. Controller 101 can also vary the amount of time during which a fixed power is supplied at a particular frequency. For example, a certain power level may be applied over a relatively short period of time at MSEs that exhibit high dissipation ratios, and the same power level may be applied over a longer period of time at MSEs that exhibit lower dissipation ratios. As mentioned above, the power level and time durations can also both be controlled to achieve a desired energy delivery profile. For example, both a lower power level and a shorter application time may be used at MSEs with high dissipation ratios, and both a high power level and a longer application time may be used at MSEs having lower dissipation ratios. Such embodiments may achieve or approximate substantially uniform energy absorption across a range of frequencies, and, in certain exemplary embodiments, the load may be heated uniformly or according to another desired heating profile.

The presently disclosed embodiments, however, are not limited to the concept of frequency sweeping and applying power (either fixed or variable) during varying time durations at frequencies within the sweep. Rather, energy delivery consistent with the presently disclosed embodiments may be accomplished more broadly by controlling any parameters that have the potential for affecting energy delivery to the load or a portion of the load. Frequency is merely one example of a parameter that can be used to affect energy absorption by the load or a portion of the load.

Electromagnetic waves in the energy application zone may exhibit a certain field pattern. A "field pattern" may refer to an electromagnetic field configuration characterized by, for example, the amplitude of electric field intensity distribution in the energy application zone. In general, electromagnetic field intensity may be time varying and spatially dependent. That is, not only may the field intensity differ at different spatial locations, but for a given location in space, the field intensity can vary in time or may oscillate, often in a sinusoidal fashion. Therefore, at different spatial locations, the field intensities may not reach their maximum values (i.e., their maximum amplitude values) at the same time. Because the field intensity amplitude at a given location can reveal information regarding the electromagnetic field, such as electromagnetic power density and energy transfer capability, the field pattern referred to herein may include a profile representing the amplitude of field intensity at one or more spatial locations. Such a field intensity amplitude profile may be the same as or different from a snapshot of the instant field intensity distribution at a given time in the zone. As used herein, the term "amplitude" is interchangeable with "magnitude."

A field pattern may be excited by applying electromagnetic energy to the energy application zone. As used herein, the term "excited" is interchangeable with "generated," "created," and "applied." In general, a field pattern in an energy application zone may be uneven (i.e., non-uniform). That is, the field pattern may include areas with relatively high amplitudes of field intensity and other areas with relatively low amplitudes of field intensity. The rate of energy transfer may depend upon the amplitude of field intensity. For example, energy transfer may occur faster at areas with higher amplitude of field intensity than in areas with lower amplitude of field intensity. As used herein, the term "energy transfer" is interchangeable with "energy delivery."

The apparatus of FIG. 3 may be configured to control a distribution and intensity of high amplitude electromagnetic field (maxima and minima) and low amplitude electromagnetic field in the energy application zone, thus delivering differing target amounts of energy to any two (or more) given regions in the application zone. The energy application may be a modal cavity. As used herein, a "modal cavity" refers to a cavity that satisfies a "modal condition." Modal condition refers to the relationship between the largest resonant wavelength supported by the energy application zone and the wavelength of the delivered electromagnetic energy supplied by the source. If the wavelength of the delivered electromagnetic energy supplied by the source is greater than about one quarter of the largest resonant wavelength supported by the energy application zone, the modal condition is met. The control of distribution and intensity of electromagnetic field in the energy application zone can occur through the selection of "MSEs" (as described later). Choices of MSE selection may impact how energy is distributed in regions of the energy application zone. When the modal condition is not met, it may be more difficult to achieve a desired energy application distribution through the control of MSEs.

The term "modulation space" or "MS" is used to collectively refer to all the parameters that may affect a field pattern in the energy application zone and all combinations thereof. In some embodiments, the "MS" may include all possible components that may be used and their potential settings (either absolute or relative to others) and adjustable parameters associated with the components. For example, the "MS" may include a plurality of variable parameters, the number of antennas, their positioning and/or orientation (if modifiable), the useable bandwidth, a set of all useable frequencies and any combinations thereof, power settings (e.g. relative power delivered at the same time to two or more irradiating feeds), time settings, phases, etc.

Examples of energy application zone-related aspects of the modulation space may include the dimensions and shape of the energy application zone and the materials from which the energy application zone is constructed. Examples of energy source-related aspects of the modulation space may include amplitude, frequency, and phase of energy delivery. Examples of radiating element-related aspects of the modulation space may include the type, number, size, shape, configuration, orientation and placement of antenna-like structures.

Figure 10:
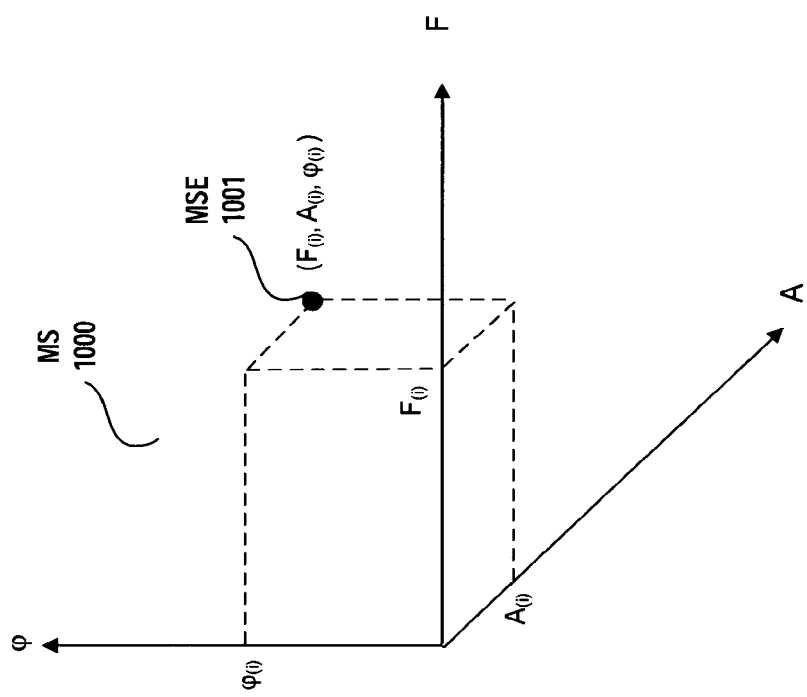
FIG. 10 illustrates an exemplary modulation space.

Each variable parameter associated with the MS is referred to as an MS dimension. By way of example, FIG. 10 illustrates a three dimensional modulation space 1000, with three dimensions designated as frequency (F), phase ($\phi$), and amplitude (A) (e.g., an amplitude difference between two or more feeds used together to provide energy to a given electromagnetic field of a given MSE). That is, in MS 1000, any of frequency, phase, and amplitude of the electromagnetic waves may be modulated during energy delivery, while all the other parameters may be predetermined and fixed during energy delivery. An MS may be one dimensional where only one parameter is varied during the energy delivery. An MS may also be higher-dimensional such that more than one parameter is varied.

The term "modulation space element" or "MSE," may refer to a specific set of values of the variable parameters in MS. Therefore, the MS may also be considered to be a collection of all possible MSEs. For example, two MSEs may differ one from another in the relative amplitudes of the energy being supplied to a plurality of radiating elements. For example, FIG. 10 shows an MSE 1001 in the three-dimensional MS 1000. MSE 1001 may have a specific frequency F(i), a specific phase $\phi$(i), and a specific amplitude A(i). If even one of these MSE variables changes, then the new set defines another MSE. For example, (3 GHz, 30°, 12 V) and (3 GHz, 60°, 12 V) are two different MSEs, although only the phase component changes. In some embodiments, sequentially swept MSEs may not necessarily be related to each other. Rather, their MSE variables may differ significantly from MSE to MSE (or may be logically related). In some embodiments, the MSE variables differ significantly from MSE to MSE, possibly with no logical relation between them, however in the aggregate, a group of working MSEs may achieve a desired energy application goal.

Differing combinations of these MS parameters may lead to differing field patterns across the energy application zone and, in turn, differing energy distribution patterns in the object. A plurality of MSEs that can be executed sequentially or simultaneously to excite a particular field pattern in the energy application zone may be collectively referred to as an "energy delivery scheme." For example, an energy delivery scheme may consist of three MSEs ($F_{(1)}$, $\phi_{(1)}$, $A_{(1)}$), ($F_{(2)}$, $\phi_{(2)}$, $A_{(2)}$), ($F_{(3)}$, $\phi_{(3)}$, $A_{(3)}$). The energy delivery scheme may comprise additional non MSE parameters, such as the time during which each MSE is applied or the power delivered at each MSE. Since there are a virtually infinite number of MSEs, there are a virtually infinite number of different energy delivery schemes, resulting in virtually infinite number of differing field patterns in any given energy application zone (although different MSEs may at times cause highly similar or even identical field patterns). Of course, the number of differing energy deliver schemes may be, in part, a function of the number of MSEs that are available. The invention, in its broadest sense, is not limited to any particular number of MSEs or MSE combinations. Rather, the number of options that may be employed could be as few as two or as many as the designer desires, depending on factors such as intended use, level of desired control, hardware or software resolution and cost.

As noted above, an apparatus or method of the invention may involve the use of a processor for executing instructions or performing logic operations. The instructions executed by the processor may, for example, be pre-loaded into the processor or may be stored in a separate memory unit such as a RAM, a ROM, a hard disk, an optical disk, a magnetic medium, a flash memory, other permanent, fixed, or volatile memory, or any other mechanism capable of providing instructions to the processor. The processor(s) may be customized for a particular use, or can be configured for general-purpose use and perform different functions by executing different software.

If more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically, wirelessly or in any other way permitting at least one signal to be communicated between them.

A single or multiple processors may be provided for the sole purpose of regulating the source. Alternatively, a single or multiple processors may be provided with the function of regulating the source in addition to providing other functions. For example, the same processor(s) used to regulate the source may also be integrated into a control circuit that provides additional control functions to components other than the source.

In accordance with some embodiments of the invention, at least one processor may be configured to regulate the source in order to deliver a first predetermined amount of energy to a first predetermined region and a second predetermined amount of energy to a second predetermined region in the energy application zone, wherein the first predetermined amount of energy is different from the second predetermined amount of energy. For example, field patterns may be selected having known areas with high amplitude of electromagnetic field intensity (hot spots). Thus, by aligning a hot spot with a region in an energy application zone, a predetermined field pattern may be chosen to deliver a first predetermined amount of energy to a first predetermined region. When another field pattern is chosen having a differing hot spot, that second field pattern may result in delivery of a second predetermined amount of energy to a second predetermined region. And as also described later, differing MSEs and/or combinations of MSEs may be chosen in order to deliver differing predetermined amounts of energy to differing predetermined regions. In either instance, control of the amount of energy applied may be achieved through either the processor's selection of particular field patterns or MSEs, and/or control of, for example, power level (e.g. a total power provided for a given MSE), a duration of time that power is applied during a particular condition, or combinations of the above. The processor may make such selections in order to achieve a desired energy application profile.

The term "region" may include any portion of an energy application zone, such as a cell, sub-volume, sub-division, discrete sub-space, or any sub-set of the energy application zone, regardless of how that subset is discretized. In one particular example, the energy application zone may include two regions. In another example, the energy application zone may include more than two regions. The regions may or may not overlap with each other, and the size of each region may or may not be the same.

The at least one processor may also be configured to predetermine the locations of the first region and the second region. This may occur, for example, through reflective feedback from the energy application zone, providing information about a location of an object in the zone. In other embodiments, this might be achieved through imaging. In some embodiments, the regions may correspond to different portions of the object, and differing targeted amounts of electromagnetic energy may be delivered to these different portions of the object. The amount of energy actually dissipated in each region may depend on the field intensity at that region and the absorption characteristics of the corresponding portion of the object at that particular region. In yet other embodiments, the predetermined locations may be a function of known geometry of a field pattern without reference to an object in the energy application zone. In some embodiments, locations of the first region and the second region may also be predetermined by a user or a device other than the at least one processor.

Two regions may be located adjacent to each other in the energy application zone. For example, the energy application zone may include a region occupied by an object or a portion of an object, and another region defining an area distinct from the area of the object. In this case, these two regions may be adjacent to each other and separated by a boundary. For example, the first region may be within the cup of soup being heated, and the second region may be outside of the cup of the soup. In another example, the energy application zone may include two regions that have different energy absorption characteristics within the object. For example, the first region may contain mostly water at the top layer of the soup, and the second region may contain mostly potatoes and/or meats towards the bottom layer of the soup. In another example, the first region may contain a material of a particular phase (e.g., liquid water), and the second region may contain the same material, but of a different phase (e.g., solid ice). Because of their differing energy absorption characteristics, it may be beneficial to excite field patterns with differing electrical field intensities at these two regions. Based on the difference in the local field intensities and the energy absorption characteristics of the two regions, the dissipated energy in each of the regions may be predetermined. Accordingly, the dissipated energy may be made substantially equal or different, as desired, across differing regions in the object, by selecting and controlling MSEs for constructing a suitable energy deliver scheme for delivering the energy.

MSE selection may impact how energy is distributed in regions of the energy application zone. In order to deliver differing targeted amounts of electromagnetic energy to differing predetermined regions in the energy application zone, the processor may control one or more MSEs in order to achieve a field pattern that targets energy to a specific predetermined region in the energy application zone. The selection of MSEs that result in standing waves may provide an added measure of control since standing waves tend to exhibit predictable and distinctly defined "high-intensity regions"(hot spots) and "low-intensity regions" (cold spots), as described earlier, where the a high-intensity region may exhibit an energy concentration that is readily distinguishable from a low-intensity region. It is to be understood that the term "cold spot" does not necessarily require a complete absence of applied energy. Rather, it may also refer to areas of diminished intensity relative to the hot spots. That is, in the high-intensity regions, the amplitude of field intensity is higher than the amplitude of field intensity in the low-intensity regions. Therefore, the power density in the high-intensity region is higher than the power density in the low-intensity region. The power density and field intensity of a spatial location are related to the capability of delivering electromagnetic energy to an object placed in that location. And therefore, the energy delivery or transfer rate is higher in a high-intensity region than that in a low-intensity region. In other words, the energy delivery or transfer may be more effective in a high-intensity region. Thus, by controlling the high-intensity regions and/or low intensity regions in the energy application zone, the processor may control the energy delivery to a specific spatial location. Such control of high- and low-intensity regions may be achieved by control MSEs.

Figure 9:
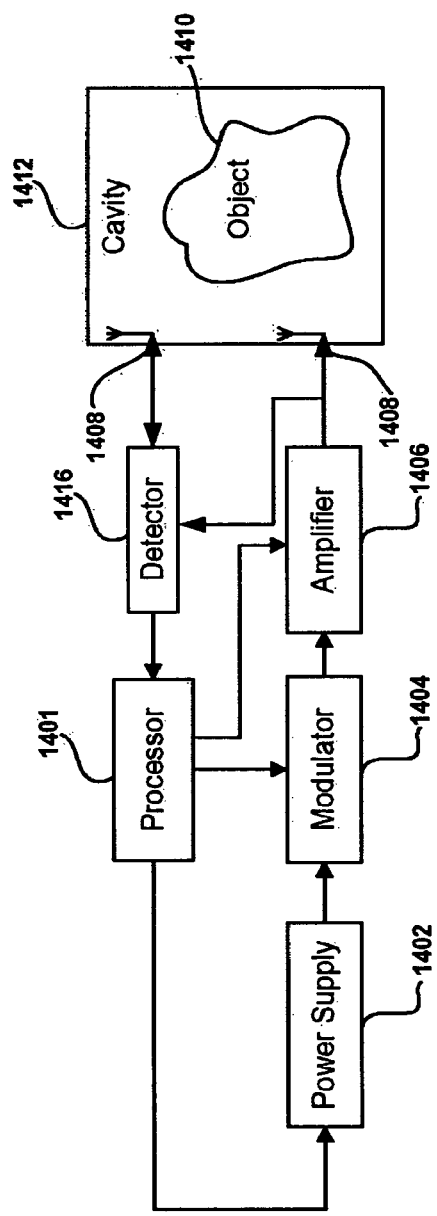
FIG. 9 represents a device in accordance with an exemplary embodiment of the present invention.

Controllable MSE variables may include one or more of amplitude, phase, and frequency of the transmitted electromagnetic wave; a location, orientation, and configuration of each radiating element; or the combination of any of these parameters, or other parameters that may affect a field pattern. For example, as depicted in FIG. 9, an exemplary processor 1401 may be electrically coupled to various components of a source, such as power supply 1402, modulator 1404, amplifier 1406, and radiating elements 1408. Processor 1401 may be configured to execute instructions that regulate one or more of these components. For example, processor 1401 may regulate the level of power supplied by power supply 1402. Processor 1401 may also regulate the amplification ratio of amplifier 1406, by switching, for example, the transistors in the amplifier. Alternatively or additionally, processor 1401 may perform pulse-width-modulation control of amplifier 1406 such that the amplifier outputs a desired waveform. Processor 1401 may regulate modulations performed by modulator 1404, and may alternatively or additionally regulate at least one of location, orientation, and configuration of each radiating element 1408, such as through an electro-mechanical device. Such an electromechanical device may include a motor or other movable structure for rotating, pivoting, shifting, sliding or otherwise changing the orientation or location of one or more of radiating elements 1408. Processor 1401 may be further configured to regulate any field adjusting elements located in the energy application zone, in order to change the field pattern in the zone. For example, field adjusting elements may be configured to selectively direct the electromagnetic energy from the radiating element, or to simultaneously match a radiating element acting as a transmitter to reduce coupling to the one or more other radiating elements acting as a receiver.

In another example, when a phase modulator is used, it may be controlled to perform a predetermined sequence of time delays on the AC waveform, such that the phase of the AC waveform is increased by a number of degrees (e.g., 10 degrees) for each of a series of time periods. Alternatively, the processor may dynamically and/or adaptively regulate modulation based on feedback from the energy application zone. For example, processor 1401 may be configured to receive an analog or digital feedback signal from detector 1416, indicating an amount of electromagnetic energy received from cavity 1412 (including object 1410), and processor 1401 may dynamically determine a time delay at the phase modulator for the next time period based on the received feedback signal.

The energy distribution that results from any given combination of MSEs may be determined, for example, through testing, simulation, or analytical calculation. Using the testing approach, sensors (e.g., small antenna) can be placed in an energy application zone, to measure the energy distribution that results from a given combination of MSEs. The distribution can then be stored in, for example, a look-up table. In a simulated approach, a virtual model may be constructed so that combinations of MSEs can be tested in a virtual manner. For example, a simulation model of an energy application zone may be performed in a computer based on a set of MSEs inputted to the computer. A simulation engine such as CST or HFSS may be used to numerically calculate the field distribution inside the energy application zone. The resulting field pattern may be visualized using imaging techniques or stored in a computer as digital data. The correlation between MSE and resulting field pattern may be established in this manner. This simulated approach can occur well in advance and the known combinations stored in a look-up table, or the simulation can be conducted on an as-needed basis during an energy application operation.

Similarly, as an alternative to testing and simulation, calculations may be performed based on an analytical model in order to predict energy distribution based on selected combination of MSEs. For example, given the shape of an energy application zone with known dimensions, the basic field pattern corresponding to a given MSE may be calculated from analytical equations. This basic field pattern, also known as a "mode," may then be used to construct a desired field pattern by linear combinations. As with the simulated approach, the analytical approach may occur well in advance and the known combinations stored in a look-up table, or may be conducted on an as-needed basis during an energy application operation.

In accordance with some embodiments of the invention, the processor may be configured to deliver predetermined amounts of energy to at least two regions in the energy application zone. The energy may be predetermined based on known characteristics of the object in the energy application zone. For example, in the case of a dedicated oven that repetitively heats products sharing the same physical characteristics (e.g., identical hamburger patties), the processor may be pre-programmed to deliver differing known quantities of energy corresponding at least two known field patterns. The processor may apply differing amounts of energy depending on the field pattern. That is, the power or duration of energy application may be varied as a function of the field pattern being applied. (i.e., resulting from an MSE). This correlation between the predetermined amounts of energy to be applied and the field pattern may be determined by testing, simulation, or analytical analysis, as discussed previously.

The correlation between field pattern and amount of energy delivered may also be determined by the energy absorption profile of object 1410. That is, object 1410 can be scanned using one or more MSEs, and corresponding dissipation ratios can be determined. Based on the dissipation ratios and desired energy delivery characteristics, a power level can be selected for each of the scanned MSEs to achieve a desired goal. For example, if the goal is to uniformly apply energy across an object's volume, then the processor might select combinations of MSEs that result in uniform energy application. If on the other hand, non-uniform energy application is desired, then the processor might apply predetermined amounts of energy with each differing field pattern in order to achieve the desired non-uniformity.

Thus, just as subsets of frequencies may be selected and swept, as described in the frequency sweeping examples above, so too may subsets of MSEs be selected and swept in order to achieve a desired energy application goal. Such a sequential process may be referred to herein as "MSE sweeping."

MSE sweeping can be used to differentially heat portions or regions of an object. For example, one or more MSEs may be scanned, and the dissipation characteristics of an object or portion of a load may be determined (e.g., dissipation ratios may be determined for the scanned MSEs). Based on the dissipation characteristics of the load, a desired power level and time duration may be selected for application at each of the scanned MSEs or at a portion of the scanned MSEs. Consistent with some of the presently disclosed embodiments, the selected power level may be fixed or, alternatively, may vary from one MSE to the next. Similarly, the selected time duration for application of power may be fixed or, alternatively, may vary from one MSE to the next. In one example, MSEs that exhibit large dissipation ratios may be assigned relatively low power values and/or low time durations for power application, and MSEs that exhibit smaller dissipation ratios may be assigned higher power values and/or longer time durations for power application. Of course, any scheme for assigning power levels and time durations to the swept MSEs may be employed depending on the particular energy application goals. MSE sweeping can then be commenced during which the selected power levels are applied for the selected time durations at the corresponding MSEs. MSE sweeping can continue until the object has achieved the desired level of heating or a desired thermal profile.

Periodically, during MSE sweeping, the load may be re-scanned using the same or different MSEs to obtain an updated set of dissipation ratios. Based on the updated set of dissipation ratios, the power levels and time durations for power application corresponding to each of the MSEs may be adjusted. This MSE scanning can occur at any desired rate depending on the requirements of a particular embodiment. In some embodiments, the MSE scan may be repeated at a rate of about 120 times per minute. Higher scan rates (e.g., 200/min or 300/min) or lower scan rates (e.g., about 100/min, 20/min, 2/min, 10/thawing time, or 3/thawing time) may be used. Additionally, the scans can be performed non-periodically. At times, an MSE scan sequence (e.g., one or more scans) may be performed once every 0.5 seconds or once every 5 seconds or at any other rate. Moreover, the period between scans may be defined by the amount of energy to be transmitted into the cavity and/or the amount of energy to be dissipated into the load. For example, after a given amount of energy (e.g. 10 kJ or less or 1 kJ or less or several hundreds of joules or even 100 J or less were transmitted or dissipated into the load or into a given portion of a load (e.g. by weight such as 100 g or by percentage, such as 50% of load)), a new scan may be performed.

To reiterate and further expand on the principles discussed above, the presently disclosed embodiments may include an apparatus for applying RF energy to a load. The apparatus may include at least one processor, as described above. For example, the processor may include an electric circuit that performs a logic operation on input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations.

The at least one processor may be configured to receive information indicative of energy dissipated by the load (a/k/a, object) for each of a plurality of modulation space elements (MSEs). For example, the information received indicative of energy dissipated by the load may include information indicative of an amount of energy absorbed by the load, an amount of energy reflected by the load, or any or any other direct or indirect indicator of the load's ability to dissipate energy. In one embodiment, based on the information indicative of energy dissipated by the load, the processor may determine a dissipation ratio for each of the plurality of MSEs (or set of MSEs).

The processor can determine the dissipation ratios for the set of MSEs at any desired rate. In one embodiment, the set of dissipation ratios corresponding to the set of MSEs may be determined at a rate of at least about 120 times per minute. In other embodiments, the set of dissipation ratios corresponding to the set of MSEs may be determined at a rate of less than about 120 times per minute. The rate may depend on the nature of the object, the nature of the MSEs, the physical characteristics of the system, and the desired result to be achieved. By way of example only, in some instances a rate of more than five times per second may be desirable. In other instances a rate of less than twice per second may be desirable.

The processor may also be configured to associate each of the plurality of MSEs (each being associated with a field pattern in an energy application zone) with a corresponding time duration of power application, based on the received information. As used herein, a time duration of power application may refer to a length of time during which a particular power is applied to the load. The processor may be further configured to associate each of the plurality of modulation space elements with a power level value corresponding to the time duration of power application associated with the same modulation space element. The amount of energy available for delivery to the load depends on the power level and the amount of time the power is applied to the load.

The processor may be further configured to regulate energy applied to the load such that during a sweep of the plurality of MSEs, power is applied to the load at the corresponding power level value and/or at the corresponding time duration of power application. For example, as described above, MSEs that exhibit higher dissipation ratios may receive power at a level lower and/or for a shorter time than other MSEs that exhibit lower dissipation ratios. Of course any power level within an available range and any desired time duration of power application may be assigned to any MSE according to the requirements or energy delivery goals of a particular intended use.

As described above, each of the plurality of MSEs may be defined by values for any of a plurality of parameters that may affect energy delivery to a load. In one embodiment, the plurality of MSEs may be defined by values for frequency, phase, and amplitude and optionally for other dimensions. In other embodiments, the MSEs may be one dimensional such that only one parameter varies and any others remain constant. For example, a set of one dimensional MSEs may differ from each other in only one of frequency, phase and amplitude. In certain embodiments, the frequency values may vary among a plurality of MSEs, while values for other parameters, such as phase and/or amplitude remain constant.

The disclosed embodiments may also include a cavity for receiving the load and at least one radiating element for directing EM energy to the load. Further, the apparatus may include a generator of EM energy for supplying EM energy to the load via the at least one radiating element.

The power level values and time durations of power application associated with each of a plurality of MSEs can be chosen according to any desired energy delivery scheme. In one embodiment, a time duration of power application corresponding to a first MSE associated with a first dissipation ratio will be shorter than a time duration of power application corresponding to a second MSE associated with a second dissipation ratio, where the second dissipation ratio is lower than the first dissipation ratio. In other exemplary embodiments, the power level values associated with each of the plurality of modulation space elements may be the same.

The presently disclosed embodiments may also include an apparatus for applying RF energy to a load, where the apparatus includes at least one processor configured to determine a plurality of dissipation ratios associated with the load. Based on the plurality of dissipation ratios, the processor may be configured to set frequency/power/time triplets (as described in detail above). The processor may also be configured to regulate application of the frequency/power/time triplets to apply energy to the load.

In the presently disclosed embodiments, the processor may be configured to set the MSE/power/time triplets such that an MSE associated with a first dissipation ratio is assigned a power level lower than a second MSE associated with a second dissipation ratio, when the first dissipation ratio is higher than the second dissipation ratio. The processor may also be configured to set the MSE/power/time triplets such that an MSE associated with a first dissipation ratio will be assigned a time shorter than a second MSE associated with a second dissipation ratio, when the first dissipation ratio is higher than the second dissipation ratio.

While the forgoing paragraphs describe embodiments of the invention in connection with dissipation ratios, other embodiments of the invention may apply similar principles using indicators other than dissipation ratios. For example, indicators of energy reflected to the feed from the energy application zone may be employed as an alternative, as may be any other direct, indirect, or inverse indicator of energy absorbability.

Exemplary Application

In the following examples the device used was a 900 Watts device with a working band at 800-1000 MHz, constructed and operated essentially according to an embodiment of above-mentioned WO07/096,878 ('878);

1. Warming Algorithm

Tap water (500 gr) was heated by a protocol suitable for providing essentially the same amount of energy to all portions of the load. A total of 60 kJ was transmitted to the load (water and the bowl in which the water was held) in each experiment.

In a first warming experiment, different amounts of energy were transmitted at different frequencies by transmitting each frequency for the same fixed period of time, while varying the period of transmission, according to an embodiment of '878. In this example, the water heated from ca. 22° C. to ca. 38° C. (an increase of 16° C.) in 2:25 minutes.

In a second warming experiment, different amounts of energy were transmitted at different frequencies by transmitting each frequency at the maximum available power and varying the time of transmission, according to an embodiment of the present invention. The water was heated from ca. 21° C. to ca. 38° C. (an increase of 17° C.) in 1:58 minutes (ca. 80% of the time needed for the first warming experiment).

The difference in temperature increase may be attributed, for example, to inaccuracy of the thermometer and/or to slight differences between the bowls which may have led to different absorbance of RF energy.

2. Thawing Algorithm

Frozen chicken breasts (boneless and skinless; bunched together before freezing) were taken from a conventional restaurant freezer at ca. −18° C., and were heated using a protocol intended for thawing, wherein a different amount of energy is transmitted at different frequencies, in accordance with an embodiment of U.S. 61/193,248 and a concurrently filed International PCT application.

In a first thawing experiment different amounts of energy were transmitted at different frequencies by transmitting each frequency for the same fixed period of time, while varying the period of transmission, according to an embodiment of '878. A 1500 gr bunch of chicken breasts was heated to 0-5° C. (measured at difference sites of the breasts) in 36 minutes.

In a second thawing experiment different amounts of energy were transmitted at different frequencies by transmitting each frequency at the maximum available power and varying the time of transmission, according to an embodiment of the present invention. A 1715 gr bunch of chicken breasts was heated to 0-5° C. (measured at difference sites of the breasts) in 20 minutes. It was thus observed that in the second thawing experiment, ca. 56% of time needed for the first thawing experiment was sufficient to thaw a larger load.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of heating a load in a cavity by irradiating the load using two radiating elements, the method comprising:
   receiving feedback from the cavity indicative of an amount of energy absorbable by the load;
   after receiving the feedback, determining, based on the received feedback, a plurality of phase differences between radiation emitted by the two radiating elements; and
   irradiating the load using the two radiating elements with radiation characterized by each of the determined plurality of phase differences.

2. The method of claim 1, wherein irradiating the load using the two radiating elements with radiation characterized by each of the determined phase differences includes sweeping over the determined plurality of phase differences.

3. The method of claim 1, wherein:
   determining the plurality of phase differences includes determining the plurality of phase differences such that feedback from the cavity indicative of energy absorbable by the load associated with each of the determined phase differences is above a predetermined level.

4. The method of claim 1, wherein irradiating the load includes controlling an amount of energy applied at each of the plurality of phase differences based on the feedback received from the cavity.

5. The method of claim 1, wherein receiving feedback includes:
   irradiating the load with the two radiating elements at multiple phase differences,
   receiving feedback indicative of energy absorption in the load in response to the irradiation at each of the multiple phase differences, and
   determining values indicative of the amount of energy absorbable by the load based on the feedback at each of the multiple phase differences.

6. The method of claim 1, wherein irradiating the load includes irradiating at the determined plurality of phase differences for a plurality of non-zero durations.

7. The method of claim 5, comprising associating each of the determined plurality of phase differences with a respective non-zero time duration of power application, based on the feedback received at the respective phase differences.

8. The method of claim 7, comprising determining the non-zero time duration based on the determined values indicative of the amount of energy absorbable by the load for radiation applied at each of the plurality of phase differences.

9. The method of claim 1, wherein irradiating the load comprises irradiating at the determined plurality of phase differences at a plurality of non-zero power levels.

10. The method of claim 9, comprising determining the plurality of non-zero power levels based on values indicative of energy absorbable by the load at each of the determined plurality of phase differences.

11. The method of claim 5, wherein receiving feedback indicative of energy absorption in the load includes measuring a reflected-coupled spectrum (RC spectrum).

12. The method of claim 1, wherein the feedback indicative of an amount of energy absorbable by the load includes a dissipation ratio.

13. The method of claim 1, wherein the feedback indicative of an amount of energy absorbable by the load includes dissipation ratio values associated with multiple phase differences.

14. The method of claim 1, wherein the two radiating elements are configured to transmit in unison.

15. The method of claim 14, wherein the two radiating elements are configured to transmit in unison at a controlled phase difference.

16. The method of claim 1, wherein determining the plurality of phase differences includes determining the plurality of phase differences such that a maximum power that can be dissipated in the load at each of the determined phase differences exceeds a threshold value.

17. The method of claim 1, wherein irradiating the load comprises irradiating at a plurality of frequencies.

18. An apparatus for heating a load in a cavity by irradiating the load using two radiating elements, the apparatus comprising a controller configured to:
receive feedback from the cavity indicative of an amount of energy absorbable by the load;
after receiving the feedback, determine, based on the received feedback, a plurality of phase differences between radiation emitted by the two radiating elements; and
cause the two radiating elements to irradiate the load with radiation characterized by each of the determined plurality of phase differences.

19. The apparatus of claim 18, wherein the controller is configured to control the irradiation of the load by sweeping over the determined plurality of phase differences.

20. The apparatus of claim 18, wherein the controller is configured to determine the plurality of phase differences such that feedback from the cavity indicative of energy absorbable by the load associated with each of the determined phase differences is above a predetermined level.

21. The apparatus of claim 19, wherein the controller is configured to cause application of the determined plurality of phase differences sequentially.

22. The apparatus of claim 18, wherein the controller is configured to cause the apparatus to:
irradiate the load with the two radiating elements at multiple phase differences,
receive feedback indicative of energy absorption in the load in response to the irradiation at the multiple phase differences, and
determine values indicative of the amount of energy absorbable by the load based on the feedback at each of the multiple phase differences.

23. The apparatus of claim 18, wherein the controller is configured to cause the apparatus to irradiate at the determined plurality of phase differences for a plurality of non-zero durations.

24. The apparatus of claim 23, wherein the controller is configured to determine the plurality of non-zero durations based on values indicative of the amount energy absorbable by the load for radiation applied at each of multiple phase differences.

25. The apparatus of claim 22, wherein the controller is configured to cause the apparatus to irradiate the load at the determined plurality of phase differences at a plurality of non-zero power levels.

26. The apparatus of claim 25, wherein the controller is further configured to determine the plurality of non-zero power levels based on the values indicative of energy absorbable by the load at the determined plurality of phase differences.

27. The apparatus of claim 22, wherein the controller is configured to receive feedback indicative of energy absorption in the load by measuring a reflected-coupled spectrum (RC spectrum).

28. The apparatus of claim 18, wherein the two radiating elements are configured to transmit in unison.

29. The apparatus of claim 28, wherein the controller is configured to control a phase difference between the two radiating elements.

30. The apparatus of claim 18, wherein the controller is configured to determine the plurality of phase differences such that a maximum power that can be dissipated in the load at each of the phase differences exceeds a threshold value.

31. The apparatus of claim 30, wherein the threshold value is substantially the same for all the determined phase differences.

32. The apparatus of claim 18, wherein the controller is configured to determine the plurality of phase differences such that a time period required for a predetermined amount of energy to be absorbed in the load at each determined phase differences is shorter than a threshold period.

33. The apparatus of claim 32, wherein the predetermined amount of energy is substantially the same for all the determined phase differences.

34. The apparatus of claim 18, further comprising the cavity.

35. The apparatus of claim 18, further comprising more than two radiating elements.

36. The apparatus of claim 18, wherein the controller is configured to cause the apparatus to irradiate the load at a plurality of frequencies.

37. The apparatus of claim 18, wherein the controller is configured to associate each of the plurality of phase differences with a respective time duration of power application, based on the feedback at the respective phase differences.

38. An apparatus for heating a load, the apparatus comprising:
a cavity for placing the load therein;
two radiating elements configured to irradiate into the cavity electromagnetic waves at multiple phase differences between radiation emitted by the two radiating elements; and
a controller configured to:
receive feedback from the cavity indicative of an amount of energy absorbable by the load; and
after receiving the feedback, determine, based on the received feedback, a plurality of phase differences between radiation emitted by the two radiating elements.

* * * * *